United States Patent
Nishida et al.

(10) Patent No.: US 8,199,669 B2
(45) Date of Patent: Jun. 12, 2012

(54) ACCESS ROUTER, SERVICE CONTROL SYSTEM, AND SERVICE CONTROL METHOD

(75) Inventors: Katsutoshi Nishida, Yokohama (JP); Shin-ichi Isobe, Yokosuka (JP); Naoki Matsubara, Yokosuka (JP)

(73) Assignee: NTT DoCoMo, Inc., Chiyoda-ku, Tokyo (JP)

( * ) Notice: Subject to any disclaimer, the term of this patent is extended or adjusted under 35 U.S.C. 154(b) by 554 days.

(21) Appl. No.: 11/913,437

(22) PCT Filed: May 16, 2006

(86) PCT No.: PCT/JP2006/309744
§ 371 (c)(1),
(2), (4) Date: Nov. 2, 2007

(87) PCT Pub. No.: WO2006/123656
PCT Pub. Date: Nov. 23, 2006

(65) Prior Publication Data
US 2009/0238193 A1    Sep. 24, 2009

(30) Foreign Application Priority Data

May 16, 2005    (JP) .................................. 2005-142593

(51) Int. Cl.
*H04L 12/28* (2006.01)
*H04W 4/00* (2009.01)
*H04W 36/00* (2009.01)

(52) U.S. Cl. ..... 370/254; 370/331; 370/401; 455/432.1; 455/436

(58) Field of Classification Search .......................... None
See application file for complete search history.

(56) References Cited

U.S. PATENT DOCUMENTS

| | | | |
|---|---|---|---|
| 6,163,843 A * | 12/2000 | Inoue et al. ..................... | 726/11 |
| 6,690,669 B1 | 2/2004 | Tsuchiya et al. | |
| 6,862,446 B2 * | 3/2005 | O'Neill et al. ............. | 455/422.1 |

(Continued)

FOREIGN PATENT DOCUMENTS

JP    2002-271377 A    9/2002

(Continued)

OTHER PUBLICATIONS

International Search Report dated Jul. 25, 2006 (One (1) page).

(Continued)

*Primary Examiner* — Gregory Sefcheck
*Assistant Examiner* — Daniel Mitchell
(74) *Attorney, Agent, or Firm* — Crowell & Moring LLP

(57) ABSTRACT

A service is transparently provided to a mobile terminal device without the mobile terminal device knowing an address of a service providing device or a device which relays a packet in a network. A packet between the service providing device which provides a service and a mobile terminal device 10 which receives the service is relayed by a mobility control node 21. An access router 12 inquires of another device about information on the mobility control node 21, and holds correspondence information between information obtained by an inquiry result and identification information of the mobile terminal device 10 in a table. Transfer of a packet between the mobile control node 21 and the mobile terminal device 10 is controlled based on the correspondence information held in the table. With this configuration, the network can transparently provide the service to the mobile terminal device without the mobile terminal device knowing the address of the device which relays the packet in the network.

15 Claims, 17 Drawing Sheets

U.S. PATENT DOCUMENTS

| | | | |
|---|---|---|---|
| 7,333,491 B2 | 2/2008 | Chen et al. | |
| 7,483,697 B2 | 1/2009 | Ohki | |
| 2001/0029177 A1* | 10/2001 | Yamaguchi | 455/414 |
| 2003/0237002 A1 | 12/2003 | Oishi et al. | |
| 2004/0037288 A1 | 2/2004 | Bourgart et al. | |
| 2004/0114559 A1* | 6/2004 | Wang | 370/338 |
| 2005/0195773 A1* | 9/2005 | Popovich et al. | 370/338 |
| 2006/0114839 A1* | 6/2006 | Meier et al. | 370/254 |
| 2006/0227792 A1* | 10/2006 | Wetterwald et al. | 370/395.52 |

FOREIGN PATENT DOCUMENTS

| | | | |
|---|---|---|---|
| JP | 2004-32253 A | 1/2004 | |
| JP | 2004-88410 A | 3/2004 | |
| JP | 2004-247836 A | 9/2004 | |
| TW | 577206 B | 10/2000 | |
| TW | 569575 B | 4/2002 | |

OTHER PUBLICATIONS

D. Johnson, et. al., *Mobility Support in IPv6*, Network Working Group, Nokia Research Center, RFC3775, Jun. 2004, 331 pp.

H. Soliman, et. al., *Hierarchical Mobile IPv6 mobility management (HMIPv6)*, <draft-ietf-mipshop-hmipv6-04.txt>, Network Working Group, Dec. 2004, 37 pp.

C. Keszei, et. al., *Evaluation of the BRAIN Candidate Mobility Management Protocol*, 1$^{st}$ Summit Barcelona, Sep. 2001, 7 pp.

1. Taiwan Office Action (4 pages).

PCT/JP2006/309744—PCT/IB/338, dated May 22, 2008, 1 page.

PCT/JP2006/309744—PCT/IB/373, dated May 14, 2008, 1 page.

PCT/JP2006/309744—PCT/ISA/237, Translation; dated May 14, 2008, 4 pages.

1. Japanese Office Action w/Translation, dated Jun. 15, 2010, 6 pages.

Chinese Office Action w/Translation.

European Search Report, dated Mar. 25, 2011, 7 pages.

\* cited by examiner

FIG. 18

| TERMINAL IDENTIFIER | MCN INFORMATION | VALIDITY PERIOD | OPTION INFORMATION |
|---|---|---|---|
| MN_A | Address 1 | 10 | — |
| MN_B | Address 2 | 20 | — |
| MN_C | Address 1 | 30 | — |
| MN_D | Address 1 | 40 | — |

FIG. 19

| TERMINAL IP ADDRESS | FORWARDING IP ADDRESS | VALIDITY PERIOD | OPTION INFORMATION |
|---|---|---|---|
| Address A | Address 1 | 100 | — |
| Address B | Address 2 | 200 | — |
| Address C | Address 1 | 300 | — |
| Address D | Address 1 | 400 | — |

*FIG. 20*

SERVICE INFORMATION

| TERMINAL IP ADDRESS | FORWARDING IP ADDRESS | Prefix INFORMATION | VALIDITY PERIOD | OPTION INFORMATION |
|---|---|---|---|---|
| Address A | Address 1 | A | 100 | — |
| Address B | Address 2 | B | 200 | — |
| Address C | Address 1 | A | 300 | — |
| Address D | Address 1 | A | 400 | — |

ACCESS ROUTER, SERVICE CONTROL SYSTEM, AND SERVICE CONTROL METHOD

TECHNICAL FIELD

The present invention relates to an access router, a service control system, and a service control method, and particularly to an access router, a service control system, and a service control method for controlling transfer of a packet between a service providing device which provides a service and a mobile terminal device which receives the service.

BACKGROUND ART

In recent years, Mobile IP and Mobile IPv6 are being examined as schemes for providing a mobile terminal device with mobility on an IP network (For example, Non-Patent Document 1). Hereinafter, description will be made using a mobility control technique in an IPv6 network for simplicity, and Mobile IPv6 is referred to as Mobile IP.

In Mobile IP, a device implementing Mobile IP (an MIP terminal) uses two types of IP addresses so that communication continuity is achieved. That is, the MIP terminal uses Home Address (hereinafter abbreviated as HoA) and Care-of Address (hereinafter abbreviated as CoA). The HoA is an address which is used by a terminal application and assigned on a home link. On the other hand, the CoA is an address which is dynamically acquired by a Router Advertisement (RA) that is advertised from a connected access router on an external link to the MIP terminal or a Dynamic Host Configuration Protocol (hereinafter abbreviated as DHCP) and used for packet forwarding.

In addition, on the home link, a Home Agent (hereinafter abbreviated as HA) which manages combination information of HoA and CoA is placed for managing mobility information of the MIP terminal. The MIP terminal sends a Binding Update signal on periodical basis as well as when the CoA is updated to register combination information of HoA and CoA with the HA.

In addition, the HA has a function to forward a packet addressed to an MIP terminal whose address is HoA to the terminal by encapsulating the packet using CoA information registered with the HA. This allows a packet to be constantly forwarded to a current location of the MIP terminal, even if CoA is dynamically changed due to movement of the terminal, by registering the change with the HA through transmission of the Binding Update, so that a communication system which provides communication mobility can be constructed.

However, in mobile IP, each time the terminal moves across access routers (hereinafter, access router is abbreviated as AR), it is required that the CoA is updated and a Binding Update signal is sent to the HA installed in a home network to update combination information of HoA and CoA. Therefore, there is a problem that the terminal cannot receive a packet in a time in which the update of the CoA and the transmission of the Binding Update signal are completed, and thereby a service of a terminal application is interrupted (hereinafter, this problem is referred to as the problem A).

There are proposed some schemes for reducing such a service interruption time to provide seamless mobility to a terminal which performs real-time application. Among them, as protocols in which prediction of movement of a terminal is not assumed, there are Hierarchical Mobile IPv6 (HMIP) (for example, see Non-Patent Document 2) and unplanned handover of Brain Candidate Mobility Management Protocol (BCMP) (for example, see Non-Patent Document 3). These will be hereinafter described.

(HMIP)

FIG. 21 is a schematic diagram which shows an operation example of HMIP. In HMIP, Mobility Anchor Point (MAP) is introduced which has a function equivalent to HA as a node which controls mobility.

An MAP 31 is located in a position at which ARs 11 and 12 are bound, and manages mobility information of a terminal 10 which moves between the ARs under the MAP 31. An MAP 32 is also located in a position at which an AR 13 and so on are bound and manages mobility information as well.

In HMIP, two types of CoA, i.e., Local CoA (hereinafter abbreviated as LCoA) which is updated each time an AR is moved, and Regional CoA (hereinafter abbreviated as RCoA) which is updated each time an AR is moved across an area corresponding to an MAP and provides a function equivalent to CoA in mobile IP, are defined. Then, RCoA is registered with the HA, and combination of RCoA and LCoA is registered as mobility information with the MAP. Thereby, a packet which is sent from a CN (Correspondent Node) that is a communication partner to the terminal is forwarded via the HA (not shown) to the MAP, and further forwarded to the terminal referring to the mobility information of the MAP.

Then, if the mobile terminal device 10 moves between the ARs under the MAP (step S1), an LCoA is generated using advertisement information received from the destination AR 12 (step S2), and a combination of the updated LCoA and the RCoA which is the same as before the movement is just registered with the MAP (step S3), but the RCoA is not updated and registered with the HA.

On the other hand, if the mobile terminal device 10 moves across MAPs (step S4), an LCoA and an RCoA are generated using advertisement information received from the destination AR 13 (step S5), and an MAP information table which holds an IP address of the MAP managed by the terminal itself is updated (step S6). Then, the mobile terminal device 10 notifies the HA of the updated RCoA by a Binding Update (not shown), and notifies the MAP of the updated RCoA and LCoA by a Local Binding Update (step S8). In addition, for reducing packet loss during handover processing, a request notification may be made for an MAP that was connected at a previous time (hereinafter referred to as old MAP) so as to forward a packet arrived at the old MAP to the updated LCoA in a time until the Binding Update to the HA is completed (step S7). Thereby, the mobility information is updated.

As described above, with respect to movement under an MAP, a time until completion of a transmission of Binding Update, which is one of the causes of service interruption in a conventional MIP, is reduced by registering terminal position information with an MAP that is closer to the terminal than the HA. By processing in this way, a time required for handover is reduced and reduction of service interruption time in a terminal application is achieved.

As described above, to realize the HMIP, an IP address of an MAP which manages movement between ARs is added to an RA which is sent from an AR on periodical basis or upon request of a terminal, so that the terminal is notified of the IP address. The terminal creates an RCoA from the IP address of the MAP contained in the RA, and an LCoA by Prefix information of the AR contained in the RA or DHCP. Acquired MAP information is held by the terminal constantly and used for sending Local Binding Update to the MAP. In addition, if the terminal moves across MAPs, with respect to the old MAP held by the terminal, new LCoA information acquired at an MAP to which the terminal moves (hereinafter referred to as new MAP) is sent to an old MAP.

Therefore, although a packet is forwarded to an old RCoA while a new RCoA is registered with the HA, the new LCoA that is a forwarding address is registered as mobility control information with the old MAP, so that the terminal can receive this information under a destination AR and thus packet loss is reduced.

(BCMP)

FIG. 22 is a schematic diagram which shows an operation example of BCMP. As BCMP, there are a handover control scheme using movement prediction (planned handover) and a handover control not using movement prediction or for prediction failure (unplanned handover). FIG. 22 illustrates an operation example of BCMP in the latter case.

BCMP is constructed by a BRAIN Access Router (BAR), an Anchor Router (ANR), and other routers which implement BCMP. In FIG. 22, operation of a terminal in communication for moving across BARs in an ANR 4 is noted for simplicity, so that only operations associated with the BARs 51 and 52 and the ANR 4 are shown. Additionally, it is assumed that an IP address is assigned to the mobile terminal device 10 from the ANR when the mobile terminal device performs a connection process to connect to the network, and a tunnel control process required for encapsulated forwarding is performed between the ANR and BAR in advance. Therefore, a packet sent from its communication partner to the IP address of the terminal is forwarded to the ANR 4, and then forwarded to the BAR 51 to which the terminal currently connects based on the tunnel control information determined by the IP address of the mobile terminal device 10.

In the figure, when the terminal moves from the currently connected BAR (hereinafter referred to as old BAR) 51 to the destination BAR (hereinafter referred to as new BAR) (step S11), the terminal obtains information of the new BAR 52 (step S12), and then sends a handover request signal containing information of the old BAR to the new BAR 52 (step S13). The new BAR 52 sends a handover start request signal to the old BAR 51 based on the old BAR information based on the received signal (step S14). When the old BAR 51 receives this signal, a packet addressed to the IP address of the mobile terminal device 10, which is to be encapsulated and sent from the ANR 4 to the old BAR 51, is addressed to the new BAR 52 and forwarded by encapsulating the packet (step S15, S16).

By the means as described above, the new BAR 52 sends a redirect signal to the ANR 4 (step S17), and the mobile terminal device 10 can receive the packet which arrives at the old BAR 51 from the ANR 4 while tunnel control information between ANR and BAR stored in the ANR 4 is rewritten. Consequently, packet loss can be reduced.

As described above, in BCMP, a terminal notifies a new BAR of old BAR information, and thereby the above described handover control is achieved.

Non-Patent Document 1: "Mobility Support in IPv 6", RFC3775, June, 2004

Non-Patent Document 2: "Hierarchical Mobile IPv6 mobility management (HMIPv6)", draft-ietf-mipshop-hmipv6-04.txt, December, 2004

Non-Patent Document 3: Keszei, C., Georganopoulos, N., Turuanyi, Z. and A. Valko, "Evaluation of the BRAIN Candidate Mobility Management Protocol", IST Summit Barcelona, September 2001.

However, the HMIP and BCMP described above have problems as described below.

In the HMIP and BCMP described above, to solve the problem A described above, the terminal needs to know an address of a control node (an MAP in HMIP, a BAR in BCMP) to which the terminal provides a mobility service, and the terminal itself needs to perform mobility processing directly or indirectly on the control node. Because of this, notification of an address of the mobility control node in a network must be given to the terminal in advance or in any way, and thus there is a problem that a network operator cannot hide information of a mobility control node whose existence is desired to be hidden from the outside of the network with respect to security.

Additionally, in HMIP or the like, since a function of HMIP is required to be added to a terminal side to overcome a problem of MIP, advance mobility control cannot be transparently provided to a terminal which has only a function of a conventional mobility control scheme such as MIP.

To solve the foregoing problems, it is contemplated that, in a network which accommodates a mobile terminal, an address of a service providing device is uniquely determined on the network side without notifying the terminal of the address of the service providing device which provides a service to the terminal and without requesting the terminal side to add a function to the terminal side. The present invention is made to solve the above described problems of the prior arts, and the object of the present invention is to provide an access router, a service control system, and a service control method which allow a network to transparently provide a service to a mobile terminal device without the mobile terminal device knowing an address of a service providing device or a device which relays a packet in a network.

DISCLOSURE OF THE INVENTION

An access router according to claim 1 of the present invention is an access router having a function for holding information required for providing a service between a service providing device which provides the service and a mobile terminal device which receives the service, characterized in that the access router comprises inquiry means (a message control section 45 described later) for inquiring of another device about information on the service providing device, and holding means (a correspondence information holding section 43) for holding correspondence information between information obtained by an inquiry result of the inquiry means and identification information of the mobile terminal device, wherein the service between the service providing device and the mobile terminal device is controlled based on the correspondence information held in the holding means. By employing the access router configured as described above, a network can transparently provide a service to the mobile terminal device without the mobile terminal device knowing an address of the service providing device in the network.

An access router according to claim 2 of the present invention is an access router which controls transfer of a packet between a service providing device which provides a service and a mobile terminal device which receives the service, characterized in that the access router comprises inquiry means (corresponding to the message control section 45 described later) for inquiring of another device about information on a device which relays the packet, and holding means (corresponding to the correspondence information holding section 43 described later) for holding correspondence information between information obtained by an inquiry result of the inquiry means and identification information of the mobile terminal device, wherein the transfer of the packet between the device which relays the packet and the mobile terminal device is controlled based on the correspondence information held in the holding means. By employing the access router configured as described above, a network can transparently provide a service to the mobile terminal device without the mobile terminal device knowing an address of the device which relays the packet in the network.

An access router according to claim 3 of the present invention is the access router according to claim 1 or 2, characterized in that the inquiry means inquires about identification information of a mobility control device which performs transfer of a packet between the mobile control device and an access router to which the mobile terminal device currently connects, and the holding means holds correspondence information between the identification information of the mobility control device and the identification information of the mobile terminal device. By holding the correspondence information between the identification information in this way, a network can transparently provide a service to the mobile terminal device without the need to provide the mobile terminal device with a special configuration.

An access router according to claim 4 of the present invention is the access router according to any one of claims 1 to 3, characterized in that it further comprises identification information acquiring means (corresponding to a terminal identifier processing section 42 described later) for acquiring a part of an IP address in a message which is transferred between the access router and the mobile terminal device as identification information of the mobile terminal device. By acquiring the identification information of the mobile terminal device in this way, a network can transparently provide a service to the mobile terminal device without the need to provide the mobile terminal device with a special configuration.

An access router according to claim 5 of the present invention is the access router according to any one of claims 1 to 4, characterized in that it further comprises Prefix information acquiring means (corresponding to a Prefix information acquiring section 46 described later) for acquiring Prefix information from a response to a message sent by own equipment, and advertising means (corresponding to an advertising section 47 described later) for advertising the Prefix information acquired by the Prefix information acquiring means to the mobile terminal device. According to such a configuration, when the access router sends a message to the service providing device or the mobility control node, the access router can acquire Prefix information from a response message corresponding to it and advertise the acquired Prefix information to the mobile terminal device. As used herein, "Prefix information" is information required for forwarding a packet by a router device on a network as well as an information element constituting an IP address. An IP address having Prefix information is set to a destination address when a packet is forwarded, so that the packet is forwarded to a subnet which advertises the same Prefix information as this Prefix information.

An access router according to claim 6 of the present invention is the access router according to any one of claims 1 to 3, characterized in that it further comprises identification information acquiring means which acquires a part of an IP address that is transferred between the mobile terminal device and a DHCP server as identification information of the mobile terminal device. By acquiring identification information of the mobile terminal device in this way, a network can transparently provide a service to the mobile terminal device without the need to provide the mobile terminal device with a special configuration.

A service control system according to claim 7 of the present invention is characterized in that it comprises a service providing device which provides a service to a mobile terminal device, and an access router comprising inquiry means for inquiring of another device about information on the service providing device and holding means for holding correspondence information between information obtained by an inquiry result of the inquiry means and identification information of the mobile terminal device, wherein the service between the service providing device and the mobile terminal device is controlled based on the correspondence information held in the holding means. According to this configuration, a network can transparently provide a service to the mobile terminal device without the mobile terminal device knowing an address of the service providing device in the network.

A service control system according to claim 8 of the present invention is characterized in that it comprises a mobility control device which relays a packet between a service providing device which provides a service and a mobile terminal device which receives the service, and an access router comprising inquiry means for inquiring of another device about information on the mobility control device and holding means for holding correspondence information between information obtained by an inquiry result of the inquiry means and identification information of the mobile terminal device, wherein transfer of the packet between the mobility control device and the mobile terminal device is controlled based on the correspondence information held in the holding means. According to such a configuration, a network can transparently provide a service to the mobile terminal device without the mobile terminal device knowing an address of the device which relays the packet in the network.

A service control method according to claim 9 is a service control method which controls a service between a service providing device which provides the service and a mobile terminal device which receives the service, characterized in that the method comprises an inquiring step of inquiring of another device about information on the service providing device, a holding step of holding correspondence information between information obtained by an inquiry result of the inquiring step and identification information of the mobile terminal device, and a controlling step of controlling the service between the service providing device and the mobile terminal device based on the correspondence information held by the holding step. In this way, a network can transparently provide a service to the mobile terminal device without the mobile terminal device knowing an address of the service providing device in the network.

A service control method according to claim 10 is a service control method which controls transfer of a packet between a service providing device which provides a service and a mobile terminal device which receives the service, characterized in that the method comprises an inquiring step of inquiring of another device about information on a device which relays the packet, a holding step of holding correspondence information between information obtained by an inquiry result of the inquiring step and identification information of the mobile terminal device, and a controlling step of controlling the transfer of the packet between the device which relays the packet and the mobile terminal device based on the correspondence information held by the holding step. In this way, a network can transparently provide a service to the mobile terminal device without the mobile terminal device knowing an address of the device which relays a packet in the network.

In summary, according to the present invention, in a network which accommodates a mobile terminal device which moves, without requesting the mobile terminal device for a processing function specific to a service with respect to the service provided by the network side, the network transparently provides the service to the mobile terminal device by finding a service providing device or a device which relays a packet in the network inside the network using identification information of the mobile terminal device as a key and holding correspondence information between identification information.

As described above, according to the present invention, when a mobility service or other service is provided to a mobile terminal device which moves, an address of a service providing device which provides the mobility service or other service to the mobile terminal device or a device which relays a packet can be determined at the network side while the mobile terminal device does not require a notification of address information of the service providing device or the device which relays the packet and a function for sending/receiving a signal to/from such a device. This allows a mobility service or other service to be transparently provided to the mobile terminal device. Further, a control signal occurring along the movement of the terminal which occurs in conventional scheme, which is exchanged between a mobile terminal device and an AR and required for continuously providing a service, can be reduced. In addition, an operator can hide an address of a service providing device or a device which relays a packet in a network from a mobile terminal device. Further, an access router to which the mobile terminal device moves does not have to know in advance a service providing device which provides a service to the mobile terminal device or a device which relays a packet. Further, the present invention can be applied to any mobile communication network without relying on a version of IP.

BRIEF DESCRIPTION OF THE DRAWINGS

FIG. 18 is a diagram which shows a configuration of an MCN information table held in an AR;

FIG. 19 is a diagram which shows a configuration of packet forwarding information held in an AR;

FIG. 20 is a diagram which shows a configuration example of service information;

BEST MODE FOR CARRYING OUT THE INVENTION

Hereinafter, embodiments of the present invention will be described with reference to the drawings. In each figure referred in the following description, a part equivalent to that of the other figures is indicated by the same symbol.

Figure 1:
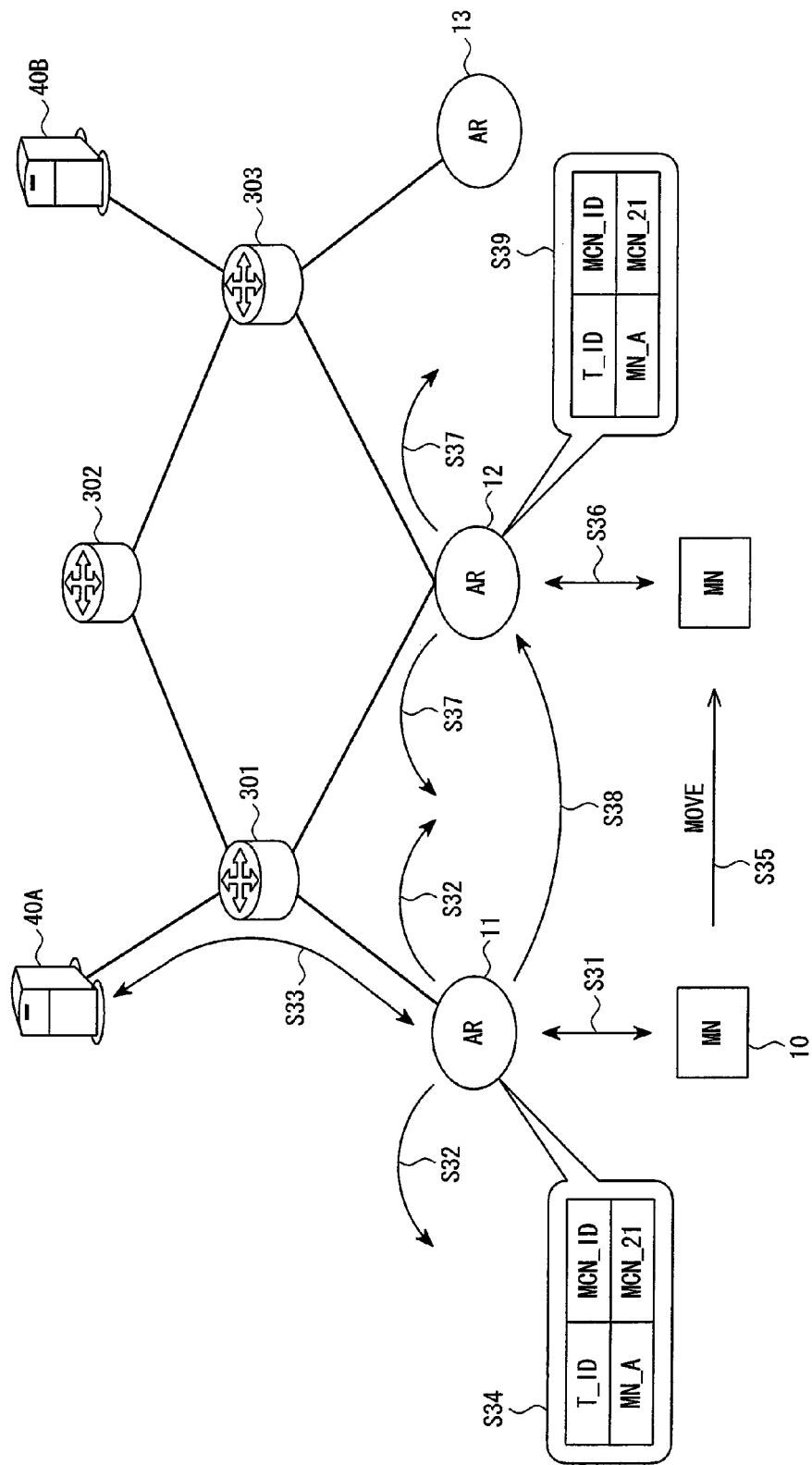
FIG. 1 is a diagram which shows a configuration example of a service control system according to an embodiment of the present invention.
Figure 2:
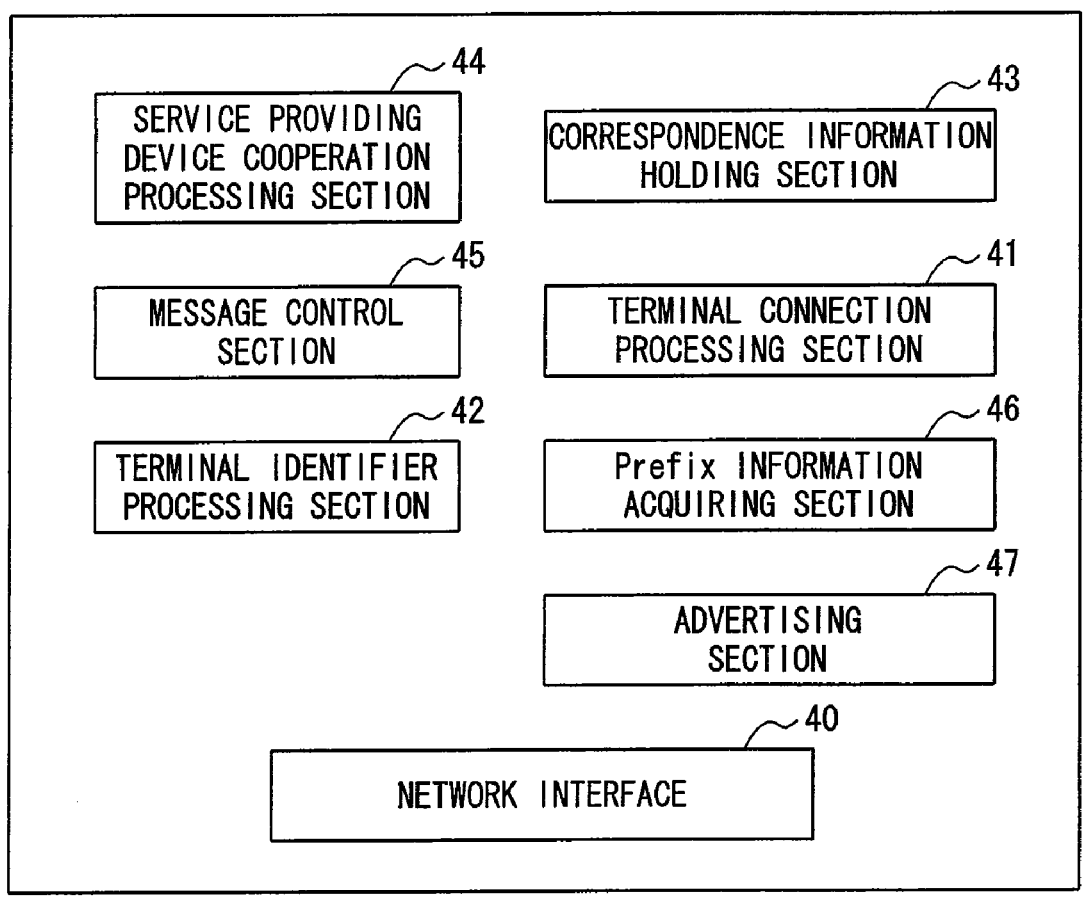
FIG. 2 is a functional block diagram which shows a configuration example of an access router in FIG. 1.

FIGS. 1 and 2 are diagrams which show a basic configuration of a service control system according to the present invention. FIGS. 3 to 20 are diagrams which show examples in a case where a network to which the present invention is applied transparently provides a mobility service to a mobile terminal device in a case where the mobile terminal device is an IP terminal having no mobility control function.

(Basic Configuration of the System)

FIG. 1 is a diagram which shows a basic configuration example of the present system. In the figure, the present system comprises service providing devices 40A, 40B which provide a service to a mobile terminal device which moves and controls the service, ARs 11 to 13 which become a connection point at which a mobile terminal device 10 connects to a network, routers 301 to 303 which have a routing function of IP packets, and the mobile terminal device 10 which has a function to connect to the network through an access router.

The service providing devices 40A, 40B have processing capacity corresponding to a service provided by themselves, information required for providing a service, and a function to exchange information required depending on service contents with the ARs 11 to 13, and addresses of the devices are exposed only to a node in the network. In a case where the present invention is applied to mobility control, the service providing devices 40A, 40B have a function to forward a packet addressed to an IP address of the mobile terminal device to an AR to which the mobile terminal device connects, a function to hold packet forwarding information required for this forwarding on a memory, a function to respond to or perform forward to another node in response to an inquiry of a service providing device, and a function to create, update, and delete packet forwarding information in cooperation with an access router.

The ARs 11 to 13 have a function to create a mobile terminal device identifier by which a mobile terminal device can be uniquely identified on the network using a message that is exchanged between the network and the mobile terminal device during connection of the mobile terminal device. In addition, the ARs 11 to 13 have a function to hold combination information of information on a service providing device and a terminal identifier in cooperation with the service providing devices 40A, 40B, and a function to exchange information on surrounding access routers and service providing devices.

(Configuration Example of Access Router)

FIG. 2 is a block diagram which shows a configuration example of an access router which becomes a connection point at which a mobile terminal device connects to a network. In the figure, the access router comprises an interface 40 for exchanging information with a mobile terminal device, surrounding access routers, and other devices in the network, a terminal connection processing section 41 which performs a process required for connection to the network with respect to a mobile terminal device, a terminal identifier processing section 42 which creates an identifier by which a mobile terminal device can be uniquely identified in the network using a message which is exchanged between the network and the mobile terminal device and is not specific to a service, a correspondence information holding section 43 which holds association information which associates a default service providing device that is set by preset or the like or a service providing device that is acquired by information exchange with a terminal identifier, a service providing device cooperation processing section 44 which exchanges information required depending on service contents in cooperation with a service providing device, and a message control section 45 which controls sending and receiving of a message for inquiring of another node device about information on a service providing node or a device which relays a packet. By using an access router configured in such a way, a network can transparently provide a service to a mobile terminal device without the mobile terminal device knowing an address of a service providing device in the network.

In addition, the access router of the present example comprises a Prefix information acquiring section 46 which acquires, if the access router sends a message for updating forwarding information used for forwarding a packet or a message to a service providing device, Prefix information from a response to the message, and an advertising section 47 which advertises the Prefix information acquired by the Prefix information acquiring section 46 to a mobile terminal device. Since such a configuration is added, if the access router sends a message to a service providing device or a mobility control node as described later, the access router can acquire Prefix information from a response message corresponding to it and advertise the acquired Prefix information to a mobile terminal device.

In the figure, an access router (AR) to which the mobile terminal device initially connects holds combination information of a terminal identifier by which the mobile terminal device can be uniquely identified and which is contained in information that is sent from the mobile terminal device to the network along with connection processing of the network, acquisition of an IP address, or mobility control processing, and an IP address of a service providing device which provides a service or a mobility control node. When the mobile terminal device moves to under a different AR (new AR), the mobile terminal device performs a process to reconnect to the network such as a process for reacquisition of an IP address. On this occasion, the new AR analyzes and acquires identification information of the mobile terminal device with respect to information sent from the mobile terminal device to the network along with the reconnection process such as reacquisition of the IP address of the mobile terminal device. Further, the AR inquires of a surrounding device such as an AR or service providing device therearound about information on a node which provides a service to the service providing device or the mobility control node, i.e., mobile terminal device based on the identification information. The new AR determines an address of the service providing device or the mobility control node according to a response from the AR that was connected before movement.

In addition, the new AR that received the response to the inquiry caches this information in the memory. Then, instead of the initially connected AR, it responds to an inquiry about the mobility control node from an AR to be connected when the mobile terminal device moves next time, so that a response time is reduced.

(Operation Example)

Procedure of an operation example in the above described basic configuration will hereinafter be described.

When the mobile terminal device 10 connects to the network for the first time, the mobile terminal device starts an initial connection process to perform a process required for connecting to the network (authentication, setting of an IP address, and the like) (step S31). Based on information exchanged in this process, the AR 11 creates a terminal identifier by which the mobile terminal device 10 can be uniquely identified in the network.

The AR 11 inquires of a surrounding AR to determine a service providing device which provides a service to the mobile terminal device 10 from information preset at configuration of the network or the like (step S32).

The AR 11 performs a process for starting providing of a service between the AR 11 and the service providing device (step S33).

Thereby, the AR 11 holds combination information of a terminal identifier and an IP address of the service providing device (step S34).

When the above processes are completed, providing of the service to the mobile terminal device is started.

At this point, the mobile terminal device 10 moves to under a different access router (step S35).

Then, the mobile terminal device 10 starts a connection process for movement (step S36). On this occasion, a process required for connection to the network such as authentication and setting of an IP address is performed as in an initial connection, and the AR 12 creates a terminal identifier using a message exchanged in this process.

The AR 12 inquires of a surrounding AR using the terminal identifier as a key to find an address of a service providing device which currently provides a service to the mobile terminal device 10 (step S37).

The AR 11 responds to this inquiry so as to send information on the service providing device requested for the AR 12 (step S38).

The AR 12 registers the received information with its own memory (step S39). In this way, a service providing device 40A can exchange information required for providing the service with the AR 12. According to the foregoing processes, it is achieved that a service provided before the mobile terminal device 10 moves is continuously provided to the mobile terminal device 10 which moves.

By the way, although the inquiry about MCN information is made to a surrounding AR in the example of FIG. 1, this inquiry may be made to surrounding nodes including an MCN (i.e., surrounding devices). In addition, when the MCN has relevant information, the MCN may respond to the inquiry.

EXAMPLES

FIGS. 3 to 20 are examples about a mobile network which allows a mobility service to be provided to a mobile terminal device in communication without adding a function to the mobile terminal device having no mobility control function.
(Configuration Example of Network)

Figure 3:
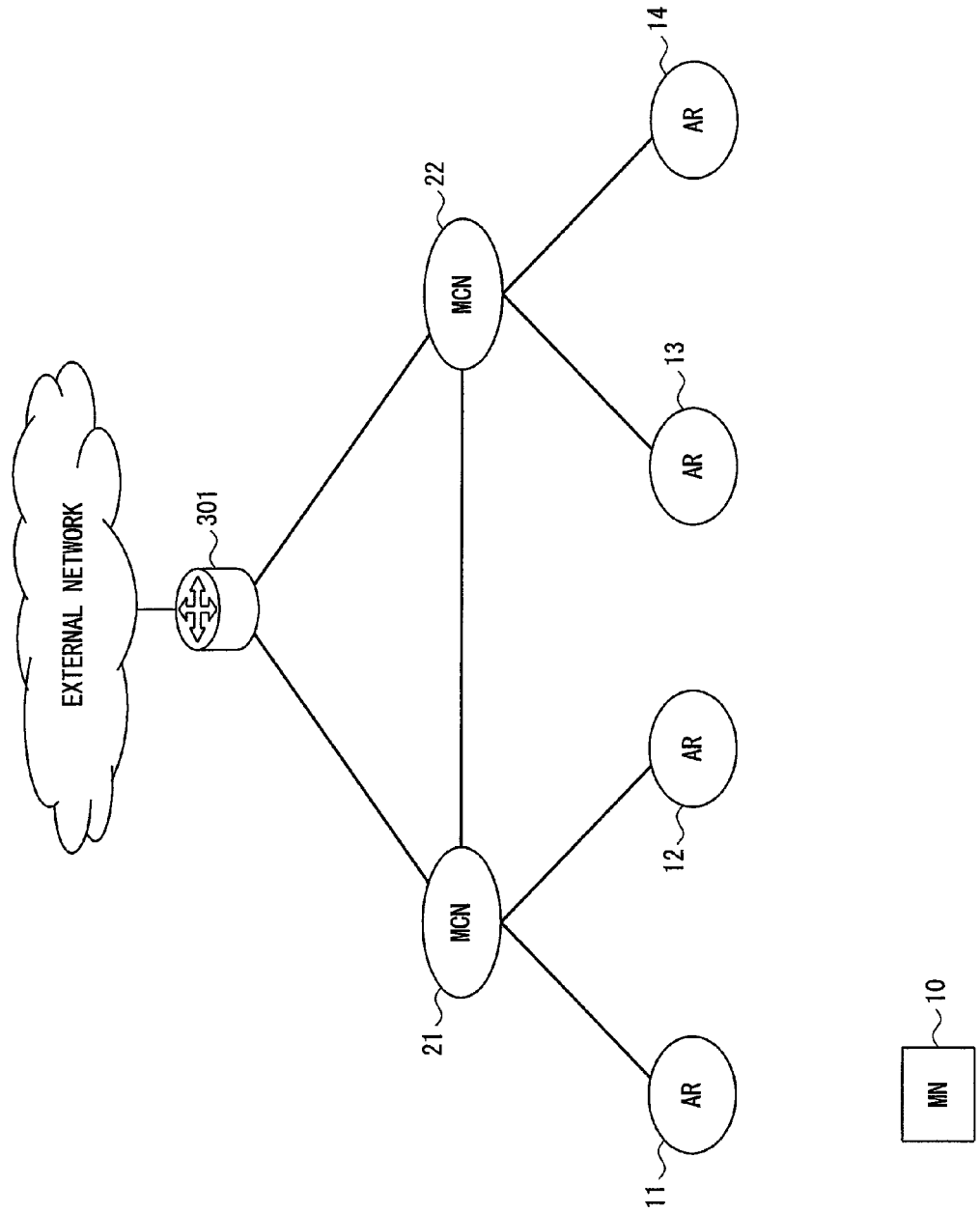
FIG. 3 is a diagram which shows a network configuration in a case where a mobility service is provided transparently to a mobile terminal device.

FIG. 3 is a diagram which shows a configuration example of a network to which the present invention is applied. The present network comprises mobility control nodes (hereinafter referred to as MCNs) 21, 22 which provide a function to forward a packet that arrives at a mobile terminal device which moves to an access router to which the mobile terminal device currently connects, ARs 11 to 14 which transparently provide a mobility service to the mobile terminal device by accommodating the mobile terminal device and cooperating with the mobility control nodes 21, 22, a router 301 which has a routing function of IP packets and connects to an external network, and the mobile terminal device (MN) 10 which has a function to connect to the network using an IP and moves in the network. When the function of the mobility control node is provided in the AR, the mobility control node is not required to be provided.

When the mobile terminal device which moves has no mobility function, for preventing a user of the mobile terminal device from recognizing service interruption, a used IP address is required not to be changed even if the mobile terminal device moves. Therefore, for preventing the mobile terminal device from recognizing the change of the IP address, each access router advertise the same Prefix information as Prefix information advertised to the terminal during an initial connection process as will be described in FIG. 4. Its details will be described later with reference to FIGS. 4, 5, and 6.
(Case where Stateless Address Auto Configuration is Used)

Figure 4:
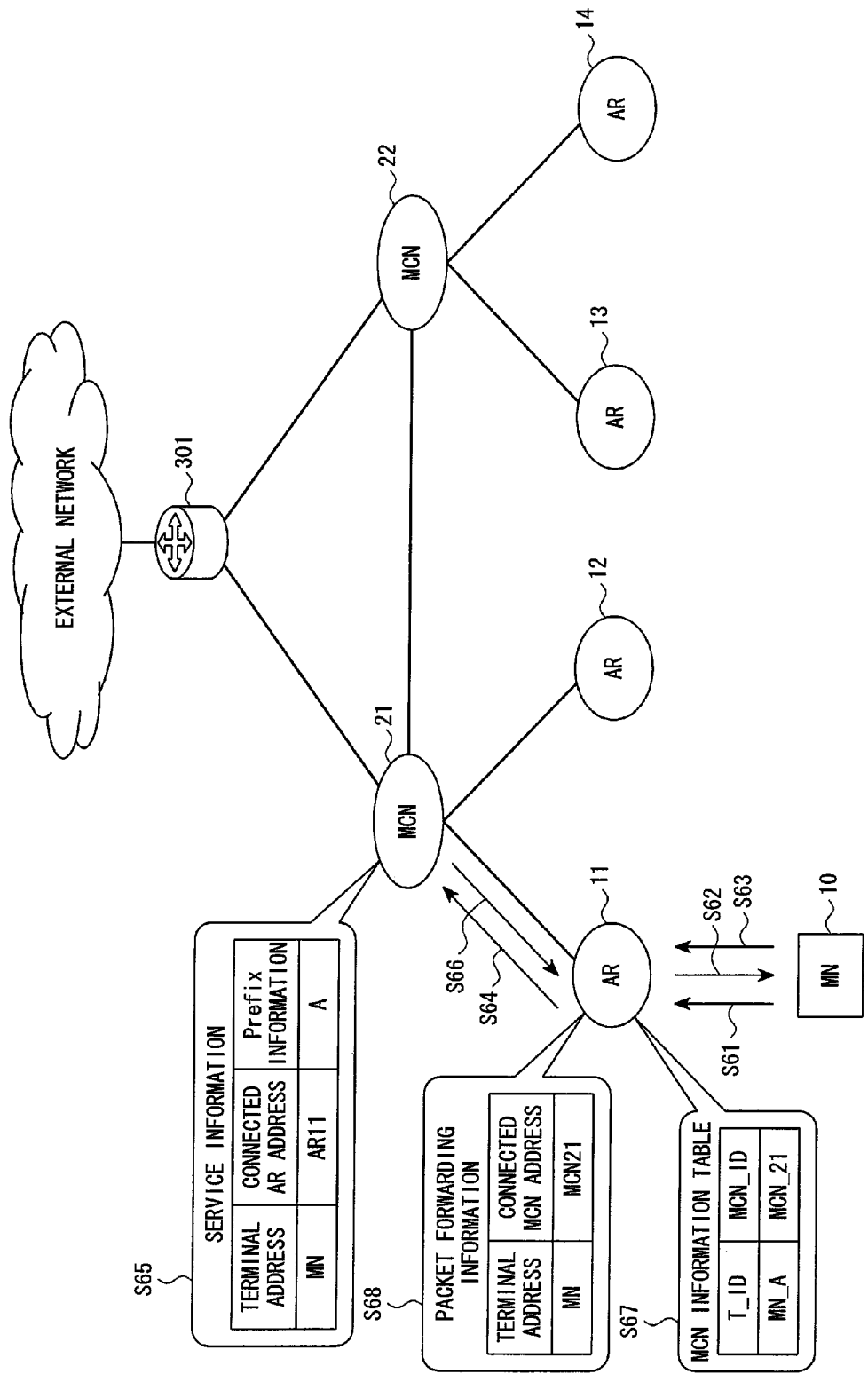
FIG. 4 is a diagram which shows a processing example in a case where a mobile terminal device connects to a network for the first time by a technique of Stateless Address Configuration.

FIG. 4 is a diagram which shows a processing example in a case where the mobile terminal device connects to the network for the first time. Procedure will be described below.

When the MN 10 connects to the network by a wired or wireless connection, the MN 10 acquires an IP address used for communication by a technique of Stateless Address Auto Configuration. Specifically, if the MN 10 sends a Router Solicitation message to the AR 11 when connecting to the network (step S61), the AR 11 responds to it so as to notify the MN 10 of Prefix information assigned to a link to which the MN 10 connects using a Router Advertisement message (step S62). The MN 10 combines the received Prefix information with an interface identifier created from interface information of the MN 10 itself or the like to create an IP address. Then, to check if this IP address does not overlap on the link to be connected, the MN 10 sends a Neighbor Solicitation message to the created IP address (step S63).

Upon receiving this message, the AR 11 breaks the IP address MN 10 down to create a terminal identifier (Terminal ID: hereinafter referred to as T-ID) by which a mobile terminal device can be uniquely identified in the network. Then, the AR 11 sends a service start request message containing the IP address of the MN 10 and the created terminal identifier to an MCN 21 (step S64). When receiving this message, the MCN 21 checks that there is no service information corresponding to the IP address of the MN on a held memory. Then, the MCN creates service information for providing a service to the MN (step S65). After that, the MCN sends a service start request response message to the AR (step S66). Upon receiving this service start request response message, the AR adds correspondence information between a T-ID and an MCN-ID (MCN information for identifying an MCN such as an IP address of the MCN) to the MCN information table (i.e., the correspondence information holding section 43 in FIG. 2) (step S67). Further, the AR creates packet forwarding information for forwarding a packet between the mobile terminal device and the MCN (step S68). From then on, the MCN 21 starts providing a mobility service to the MN 10.

As described above, the AR 11 exchanges a control signal about a mobility service provided by the MCN 21 with the MCN 21, sets packet forwarding information between the MCN 21 and the AR 11 with respect to each of the MCN 11 and the AR 11, and thus starts providing the mobility service. From then on, a packet which is addressed to the mobile terminal device 10 and arrives at the MCN 21 is forwarded to the AR 11 in the network based on correspondence information between the terminal address and the connected AR address, i.e., service information held in the MCN 21.

In addition, a packet from the mobile terminal device 10 is forwarded to the MCN 21 based on correspondence information between the terminal address and the connected MCN address i.e., packet forwarding information held in the AR 11.

Figure 5:
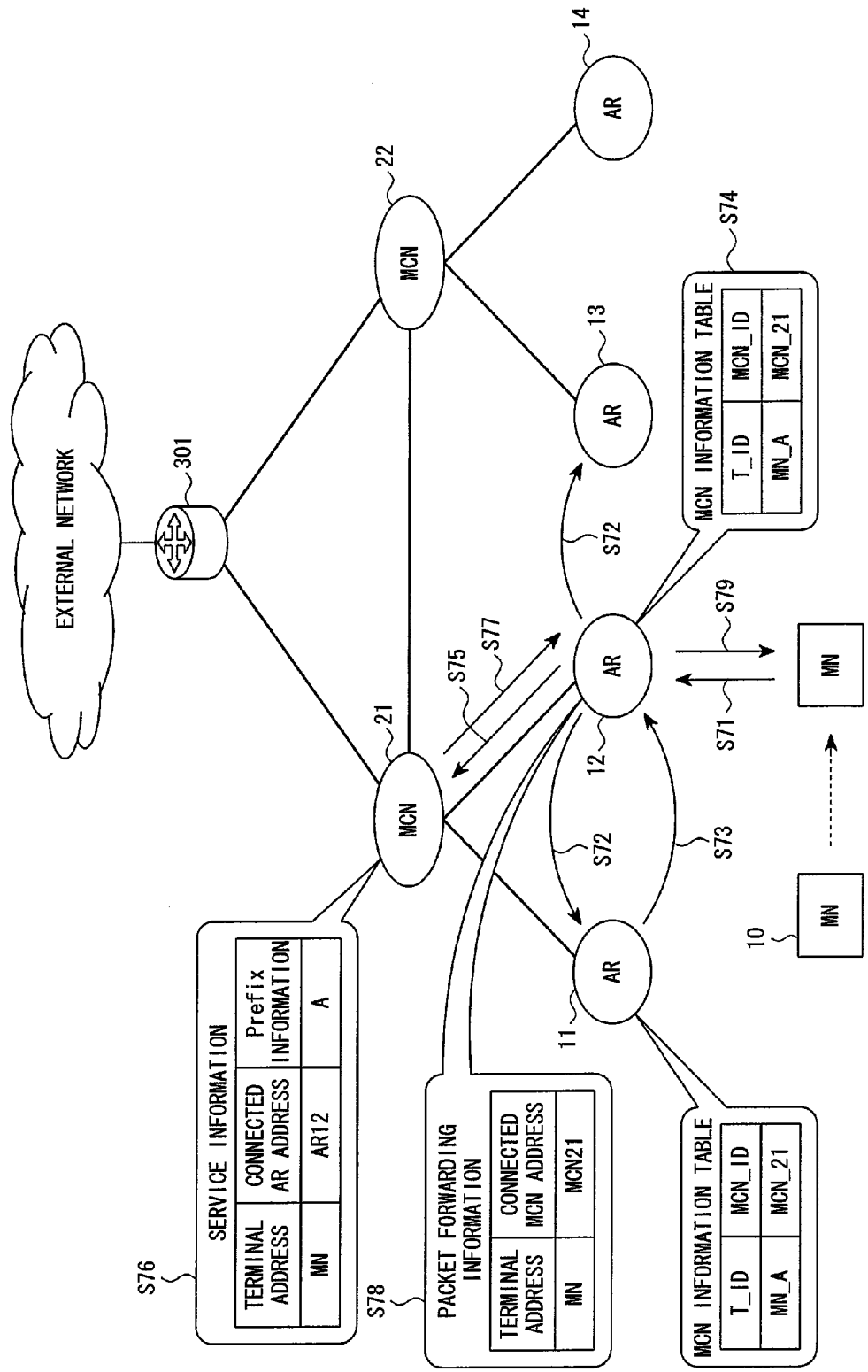
FIG. 5 is a diagram which shows a processing example in a case where an initial connection process to connect to the network is completed by the technique of Stateless Address Configuration, and movement to a different AR under an MCN which currently provides a service is performed.

FIG. 5 is a diagram which shows a processing example in a case where an initial connection process to connect to the network is completed by the technique of Stateless Address Configuration, and movement to a different AR under an MCN which currently provides a service is performed. Procedure will be described below.

If the MN 10 moves from under the AR 11 to under the AR 12, an IP address validity confirmation process is started upon reconnection information of a wireless or wired link. In other words, when the connecting link is changed, the MN 10 sends Router Solicitation (step S71) and starts the process for confirming validation of the IP address. When receiving this message, the AR 12 acquires an interface identifier contained in the IP address that is the source address. Using this as a terminal identifier, it inquires of a surrounding AR about information of an MCN which provides a mobility service (step S72). In this case, because the AR 11 to which the mobile terminal device has connected before it moves holds relevant MCN information in an MCN information table with respect to the above described inquiry, the AR 11 notifies the AR 12 of the MCN information in response to this inquiry (step S73).

The AR 12 holds the MCN information obtained as a result of the inquiry in the MCN information table in the AR 12 (step S74).

When the AR 12 to which the MN 10 currently connects receives the MCN information from the previously connected AR 11, the AR 12 sends a service start request to the MCN 21 using the terminal identifier as key information (step S75). In this message, the IP address containing the terminal identifier is contained.

Upon receiving this service start request, the MCN 21 updates service information for forwarding a packet to the MN 10 (step S76). After that, the MCN 21 sends a service start request response message to the AR 12 (step S77). At this time, the MCN 21 sends Prefix information to the AR 12.

Upon receiving this service start request response message, the AR 12 adds a correspondence between the terminal address and the connected MCN address to the packet forwarding information (step S78). Then, the AR 12 sends Router Advertisement to the MN 10 (step S79). At this time, the AR 12 sends the Prefix information notified from the MCN.

From then on, the MCN 21 stops packet forwarding to the AR 11 and starts the forwarding to the AR 12. Further, the MCN information table and packet forwarding information in the AR 11 before the movement are deleted when a validity period of a held timer is expired, or deleted by signaling from the MCN 21 or the AR 12.

By the way, although the inquiry about MCN information is made to a surrounding AR in the example of FIG. 5, this inquiry may be made to surrounding nodes including an MCN (i.e., surrounding devices). In addition, when the MCN has relevant information, the MCN may respond to the inquiry.

Figure 6:
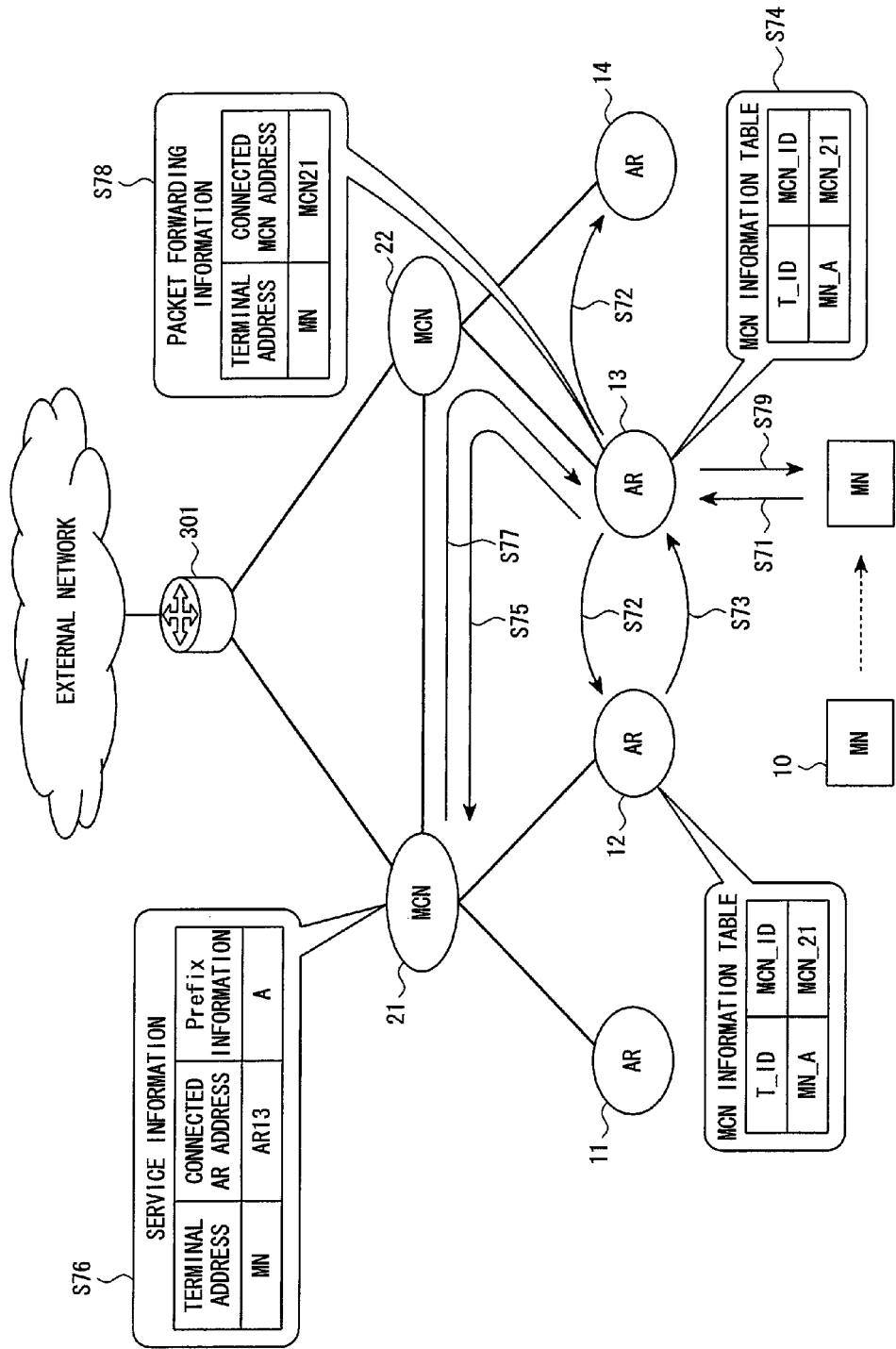
FIG. 6 is a diagram which shows a processing example in a case where an initial connection process to connect to the network is completed by the technique of Stateless Address Configuration, and movement to an AR under an MCN that is different from the MCN which currently provides a service is performed.

FIG. 6 is a diagram which shows a processing example in a case where the mobile terminal device completes an initial connection process to connect to the network by the technique of Stateless Address Configuration, and moves to an AR under an MCN that is different from the MCN which currently provides a service.

The mobile terminal device 10 moves from under the AR 12 to the AR 13 and starts an IP address validity confirmation process. In other words, when the connecting link is changed, the MN 10 sends Router Solicitation (step S71) and starts the process for confirming validation of the IP address. When receiving this message, the AR 13 acquires an interface identifier contained in the IP address that is the source address. Using this as a terminal identifier, it inquires of a surrounding AR about information of an MCN which provides a mobility service (step S72). In this case, because the AR 12 to which the mobile terminal device has connected before it moves holds relevant MCN information in an MCN information table with respect to the above described inquiry, the AR 12 notifies the AR 13 of the MCN information in response to this inquiry (step S73).

The AR 13 holds the MCN information obtained as a result of the inquiry in the MCN information table in the AR 13 (step S74).

When the AR 13 to which the MN 10 currently connects receives the MCN information from the previously connected AR 12, the AR 13 sends a service start request to the MCN 21 using the terminal identifier as key information (step S75). In this message, the IP address containing the terminal identifier is contained.

Upon receiving this service start request, the MCN 21 updates service information for forwarding a packet to the MN 10 (step S76). After that, the MCN 21 sends a service start request response message to the AR 13 (step S77). Upon receiving this service start request response message, the AR 13 adds a correspondence between the terminal address and the connected MCN address to the packet forwarding information (step S78). Then, the AR 13 sends Router Advertisement to the MN 10 (step S79). At this time, the AR 13 sends the Prefix information notified from the MCN.

From then on, the MCN 21 stops packet forwarding to the AR 12 and starts the forwarding to the AR 13. Further, the MCN information table and packet forwarding information in the AR 12 are deleted when a validity period of a held timer is expired, or deleted by signaling from the MCN 21 or the AR 13.

By the way, although the inquiry about MCN information is made to a surrounding AR in the example of FIG. 6, this inquiry may be made to surrounding nodes including an MCN (i.e., surrounding devices). In addition, when the MCN has relevant information, the MCN may respond to the inquiry.

Figure 7:
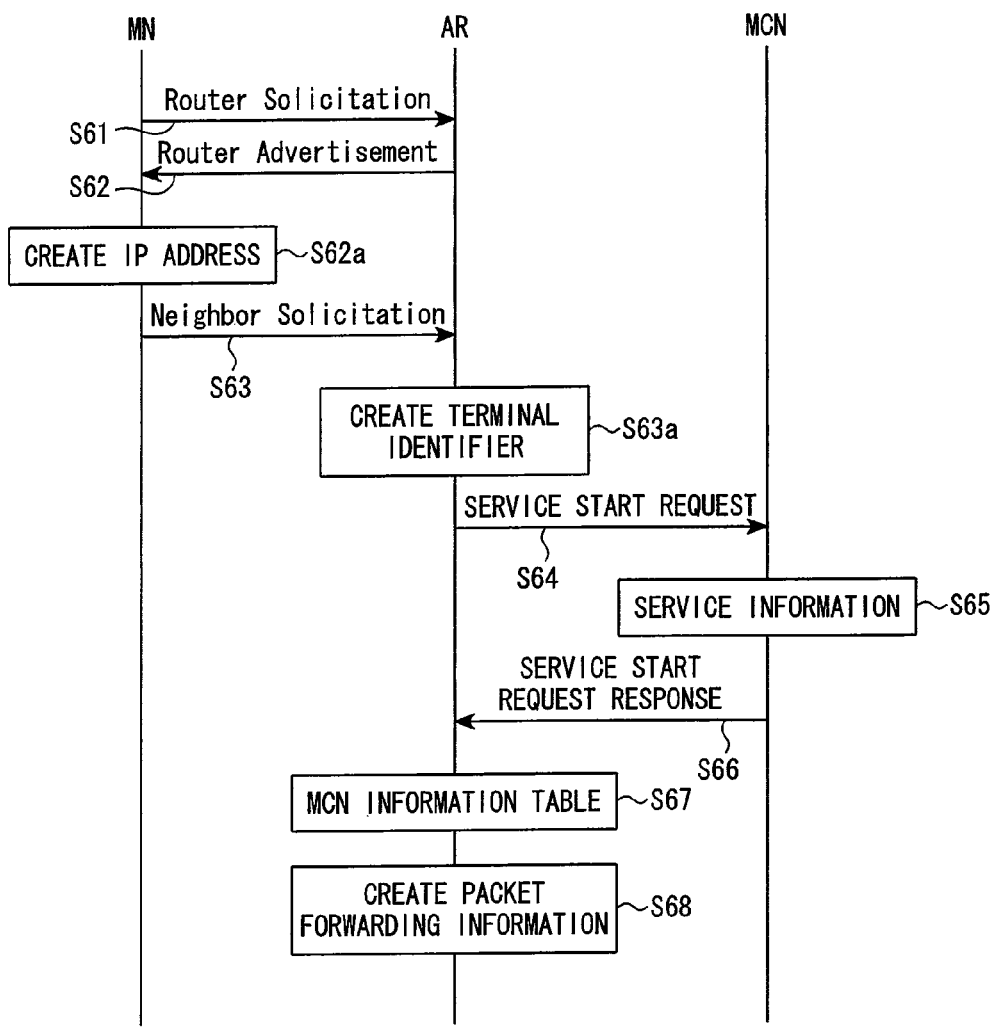
FIG. 7 is a diagram which shows a method for creating a terminal identifier at an initial connection using the technique of Stateless Address Configuration.

FIG. 7 is a sequence diagram which shows a process for creating a terminal identifier and the like at an initial connection to a network using the Stateless Address Configuration. In the figure, transfer of signals among an MN, an AR, and an MCN is shown.

In the figure, when connecting to a network, the MN sends a Router Solicitation message to the network according to RFC2462 (Request For Comments 2462 by Internet Engineering Task Force) (step S61). The access router responds to this so as to notify the MN of Prefix information assigned to a link to which the MN connects using a Router Advertisement message (step S62).

The MN combines the received Prefix information with an interface identifier created from interface information of the MN itself or the like to create an IP address (step S62*a*). To check if this IP address does not overlap on the link to be connected, the MN sends a Neighbor Solicitation message to the created IP address (step S63). Upon receiving this message, the AR breaks the IP address of the MN down to create a terminal identifier (step S63*a*), and, after that, the terminal identifier is used for inquiry to a surrounding device as a terminal identifier for identifying the MN on the network.

Figure 8:
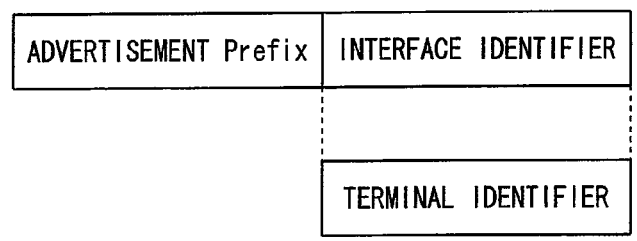
FIG. 8 is a diagram which shows a relation between an IP address of the mobile terminal device and an interface identifier in the case of FIG. 7.

In FIG. 8, a relation between an IP address of the MN and an interface identifier is shown. Referring to the figure, the IP address is composed of an advertisement Prefix part and the interface identifier, and the latter is used as a terminal identifier for identifying the MN.

Returning to FIG. 7, the AR sends a service start request message containing the IP address of the MN and the extracted terminal identifier to the MCN (step S64). When receiving this message, the MCN checks that there is no service information corresponding to the IP address of the MN on a held memory. Then, the MCN creates service information for providing a service to the MN (step S65). After that, the MCN sends a service start request response message to the AR (step S66). Upon receiving this service start request response message, the AR adds correspondence information between a T-ID and an MCN-ID to the MCN information table (step S67). Further, the AR creates packet forwarding information for forwarding a packet between the mobile terminal device and the MCN (step S68). In this way, the provision of a mobility service is prepared.

Figure 9:
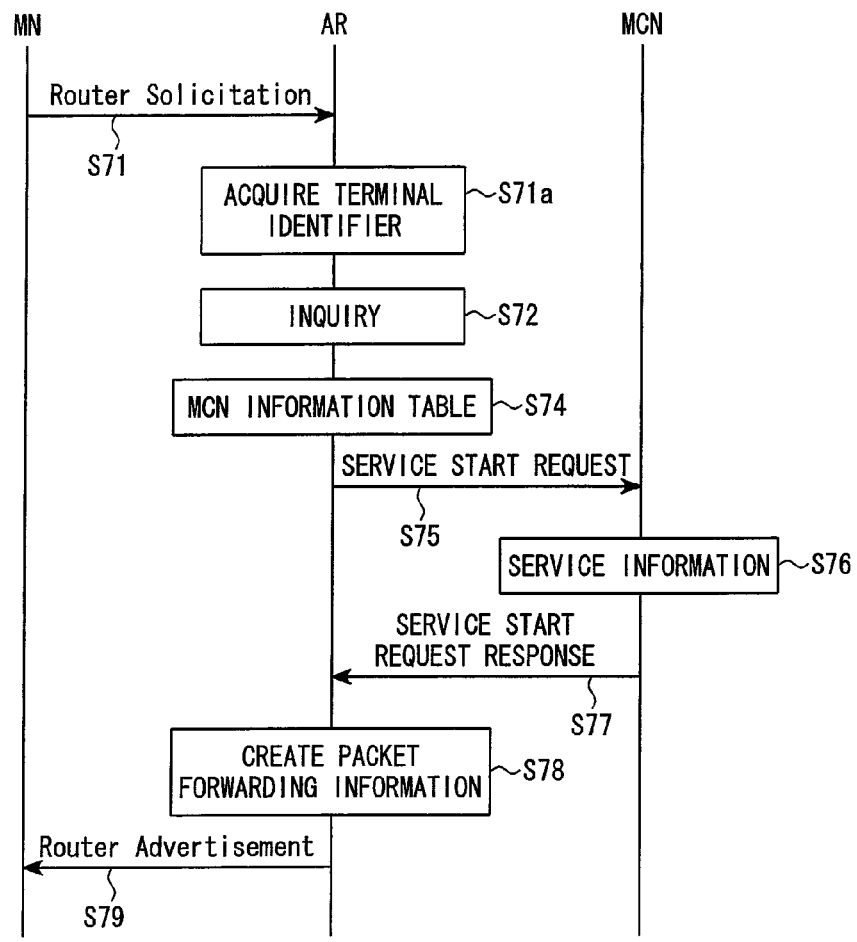
FIG. 9 is a diagram which shows a method for creating a terminal identifier in an IP address confirmation process using the technique of Stateless Address Configuration.

FIG. 9 is a sequence diagram which shows an IP address validity confirmation process due to change of a wireless or wired link and a terminal identifier creating process in an access router in a case where an IP address using the Stateless Address Configuration is used by the mobile terminal device. In the figure, transfer of signals among an MN, an AR, and an MCN is shown.

In the figure, when the connecting link is changed, a mobile terminal device sends Router Solicitation (step S71) and starts the process for confirming validation of an IP address.

When receiving this message, the AR acquires an interface identifier contained in the IP address that is the source address (step S71a). Using this as a terminal identifier, the AR inquires of a surrounding AR about information of an MCN which provides a mobility service (step S72). The MCN information obtained as a result of the inquiry is held in the MCN information table in the AR (step S74).

Figure 10:
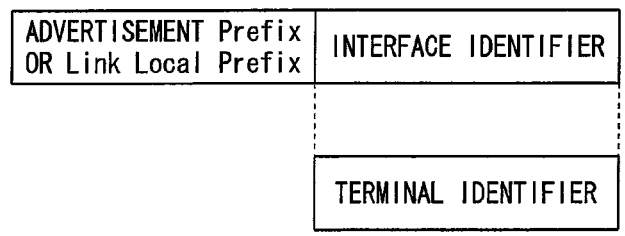
FIG. 10 is a diagram which shows a relation between an IP address of the mobile terminal device and an interface identifier in the case of FIG. 9.

In FIG. 10, a relation between an IP address of the MN and an interface identifier is shown. Referring to the figure, the IP address is composed of an advertisement Prefix part or a Link Local Prefix and the interface identifier, and the latter is used as a terminal identifier for identifying the MN.

Returning to FIG. 9, when receiving the MCN information from a previously connected AR, the AR to which the MN currently connects sends a service start request to the MCN using the terminal identifier as key information (step S75). In this message, the IP address containing the terminal identifier is contained.

Upon receiving this service start request, the MCN updates service information for forwarding a packet to the MN (step S76). After that, the MCN sends a service start request response message to the AR (step S77). Upon receiving this service start request response message, the AR holds a correspondence between the terminal address and the connected MCN address in packet forwarding information (step S78). Then, the AR sends Router Advertisement to the MN (step S79). At this time, the AR sends Prefix information notified from the MCN. By the above described processing, the MCN which starts providing the mobility service at the initial connection provides the mobility service continuously to the mobile terminal device.

(Case where DHCP is Used)

Figure 11:
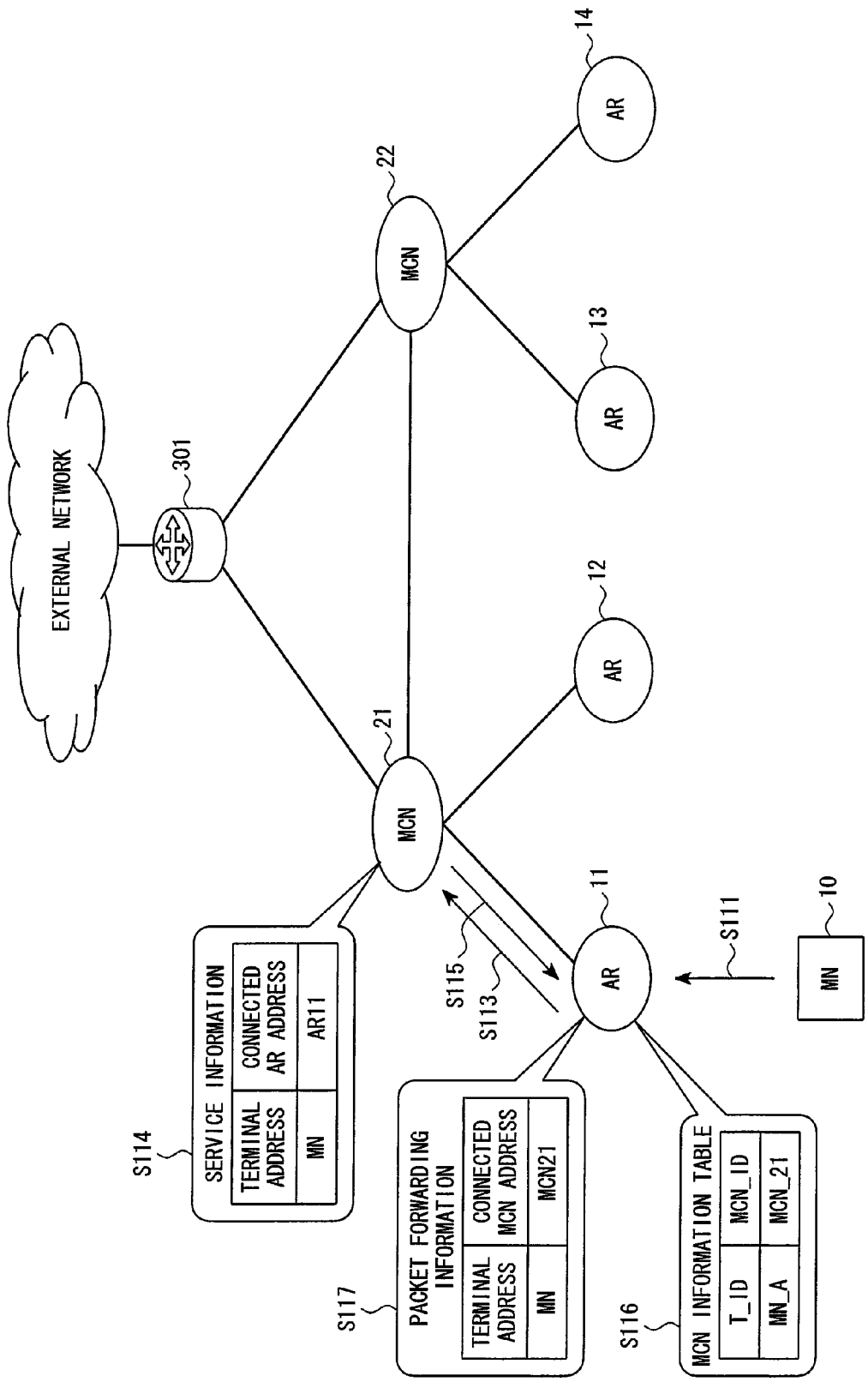
FIG. 11 is a diagram which shows a processing example in a case where a mobile terminal device connects to a network for the first time using a DHCP process.

FIG. 11 is a diagram which shows a processing example in a case where a mobile terminal device connects to a network for the first time. Procedure will be described below.

In the figure, when the MN 10 connects to the network, a DHCP process is performed (step S111). The AR 11 sends a service start request message containing an IP address of the MN 10 extracted by this DHCP process and an extracted terminal identifier to an MCN 21 (step S113). When receiving this message, the MCN 21 checks that there is no service information corresponding to the IP address of the MN 10 on a held memory. Then, the MCN 21 creates service information for providing a service to the MN 10 (step S114). After that, the MCN 21 sends a service start request response message to the AR 11 (step S115). Upon receiving this service start request response message, the AR 11 adds correspondence information between a T-ID and an MCN-ID to the MCN information table (step S116). Further, the AR 11 creates packet forwarding information for forwarding a packet between the MN 10 and the MCN 21 (step S117). Since then, the MCN 21 starts providing a mobility service to the MN 10.

Figure 12:
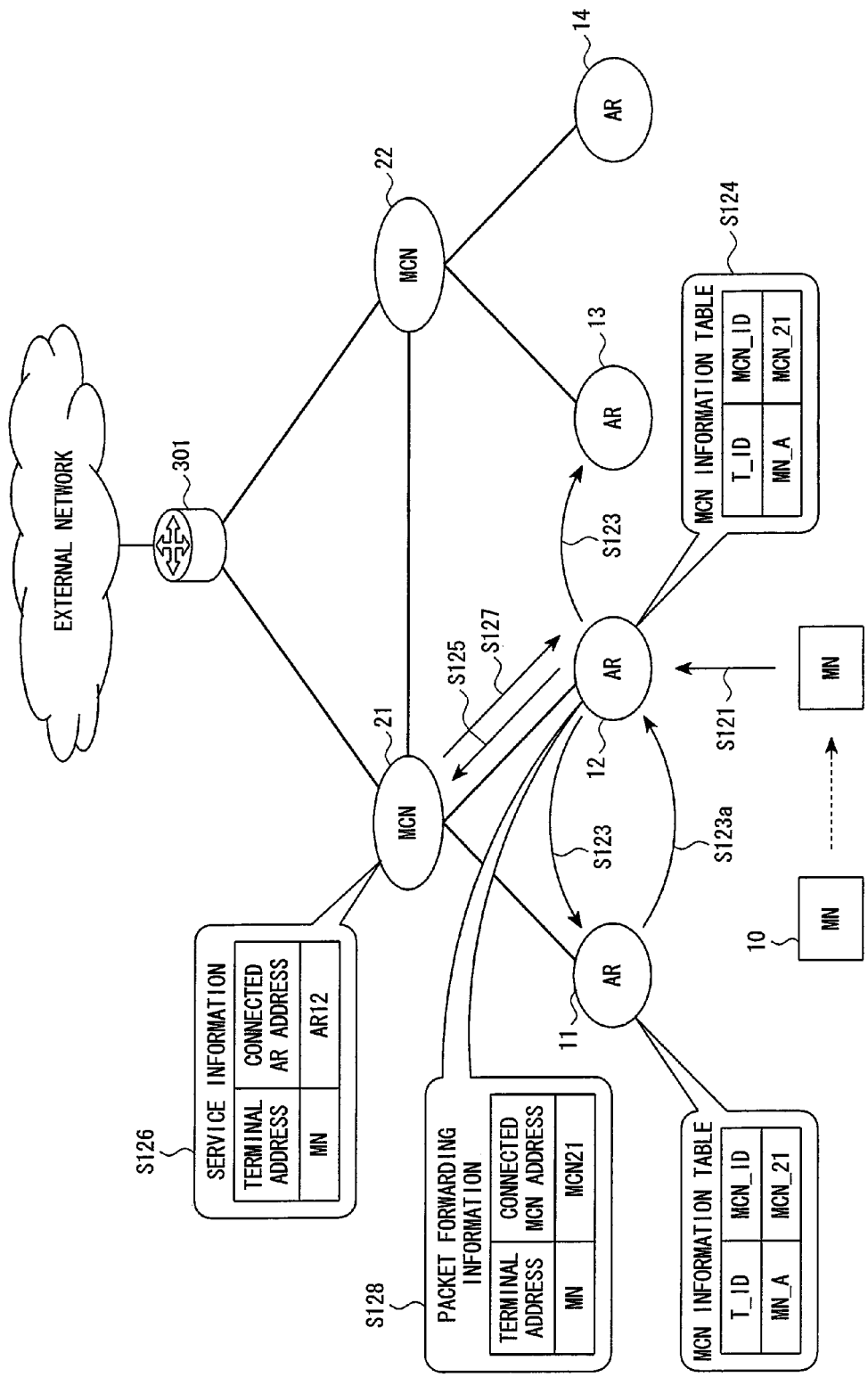
FIG. 12 is a diagram which shows a processing example in a case where a mobile terminal device completes an initial connection process to connect to the network by the DHCP process, and moves to a different AR under the MCN which currently provides a service.

FIG. 12 is a diagram which shows a processing example in a case where a mobile terminal device completes an initial connection process to connect to the network by the DHCP process, and moves to a different AR under the MCN which currently provides a service. Procedure will be described below.

In the figure, if the MN 10 moves from under the AR 11 to under the AR 12, the MN 10 detects change of a connecting link, and the DHCP process which confirms validity of a held IP address is performed (step S121). The AR 12 extracts an IP address whose validity is confirmed, and determines a Suffix part of the address as a terminal identifier. Then, using this terminal identifier, the AR 12 inquires of a surrounding AR about information of an MCN which provides a mobility service (step S123). In this case, because the AR 11 to which the mobile terminal device has connected before it moves holds relevant MCN information with respect to the above described inquiry, the AR 11 notifies the AR 12 of the MCN information in response to this inquiry (step S123a).

The AR 12 holds the MCN information obtained as a result of the inquiry in the MCN information table in the AR 12 (step S124).

When the AR 12 to which the MN 10 currently connects receives the MCN information from the previously connected AR 11, the AR 12 sends a service start request to the MCN 21 using the terminal identifier as key information (step S125). In this message, the IP address whose validity is confirmed by the DHCP process is contained.

Upon receiving this service start request, the MCN 21 updates information for forwarding a packet to the MN 10 (step S126). After that, the MCN 21 sends a service start request response message to the AR 12 (step S127). Upon receiving this service start request response message, the AR 12 holds a correspondence information between the terminal IP address and the connected MCN address as packet forwarding information (step S128). Thus, the MCN 21 which provides the service before the MN 10 moves provides the mobility service continuously to the MN 10.

Figure 13:
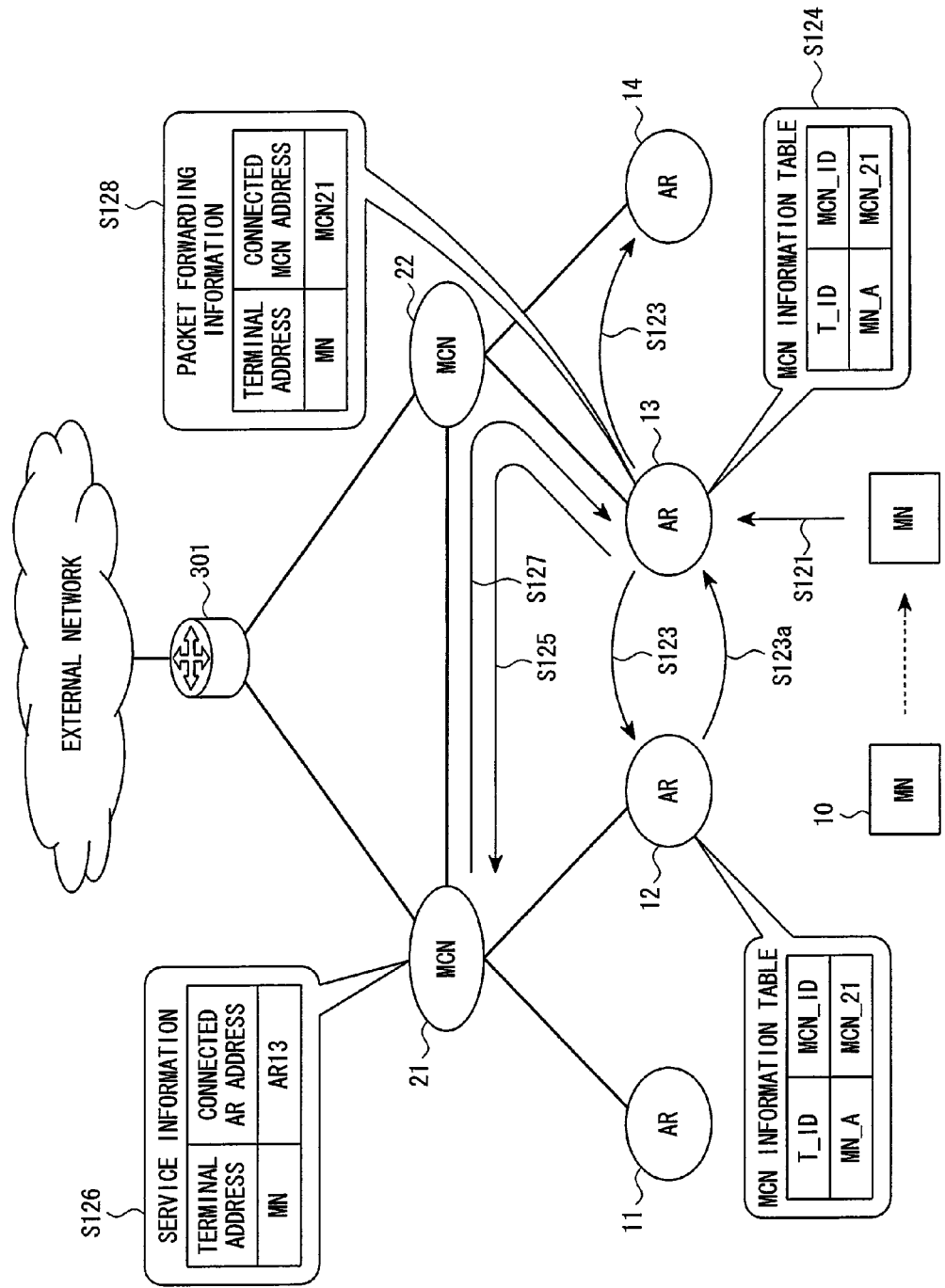
FIG. 13 is a diagram which shows a processing example in a case where the mobile terminal device completes an initial connection process to connect to the network by the DHCP process, and moves to an AR under an MCN that is different from the MCN which currently provides a service.

FIG. 13 is a diagram which shows a processing example in a case where the mobile terminal device completes an initial connection process to connect to the network by the DHCP process, and moves to an AR under an MCN that is different from the MCN which currently provides a service. Procedure will be described below.

In the figure, if the MN 10 moves from under the AR 12 to under the AR 13, the MN 10 detects change of a connecting link, and the DHCP process for confirming validity of a held IP address is performed (step S121). The AR 13 extracts an IP address whose validity is confirmed, and determines a Suffix part of the address as a terminal identifier. Then, using this terminal identifier, the AR 13 inquires of a surrounding AR about information of an MCN which provides a mobility service (step S123). In this case, because the AR 12 to which the mobile terminal device has connected before it moves holds relevant MCN information with respect to the above described inquiry, the AR 12 notifies the AR 13 of the MCN information in response to this inquiry (step S123a).

The AR 13 holds the MCN information obtained as a result of the inquiry in the MCN information table in the AR 13 (step S124).

When the AR 13 to which the MN 10 currently connects receives the MCN information from the previously connected AR 12, the AR 13 sends a service start request to the MCN 21 via the MCN 22 using the terminal identifier as key information (step S125). In this message, the IP address whose validity is confirmed by the DHCP process is contained.

Upon receiving this service start request, the MCN 21 updates-service information for forwarding a packet to the MN 10 (step S126). After that, the MCN 21 sends a service start request response message to the AR 13 via the MCN 22 (step S127). Upon receiving this service start request response message, the AR 13 holds correspondence information between the terminal IP address and the connected MCN address as the packet forwarding information (step S128). Thus, the MCN 21 which provides the service before the MN 10 moves provides the mobility service continuously to the MN 10.

Figure 14:
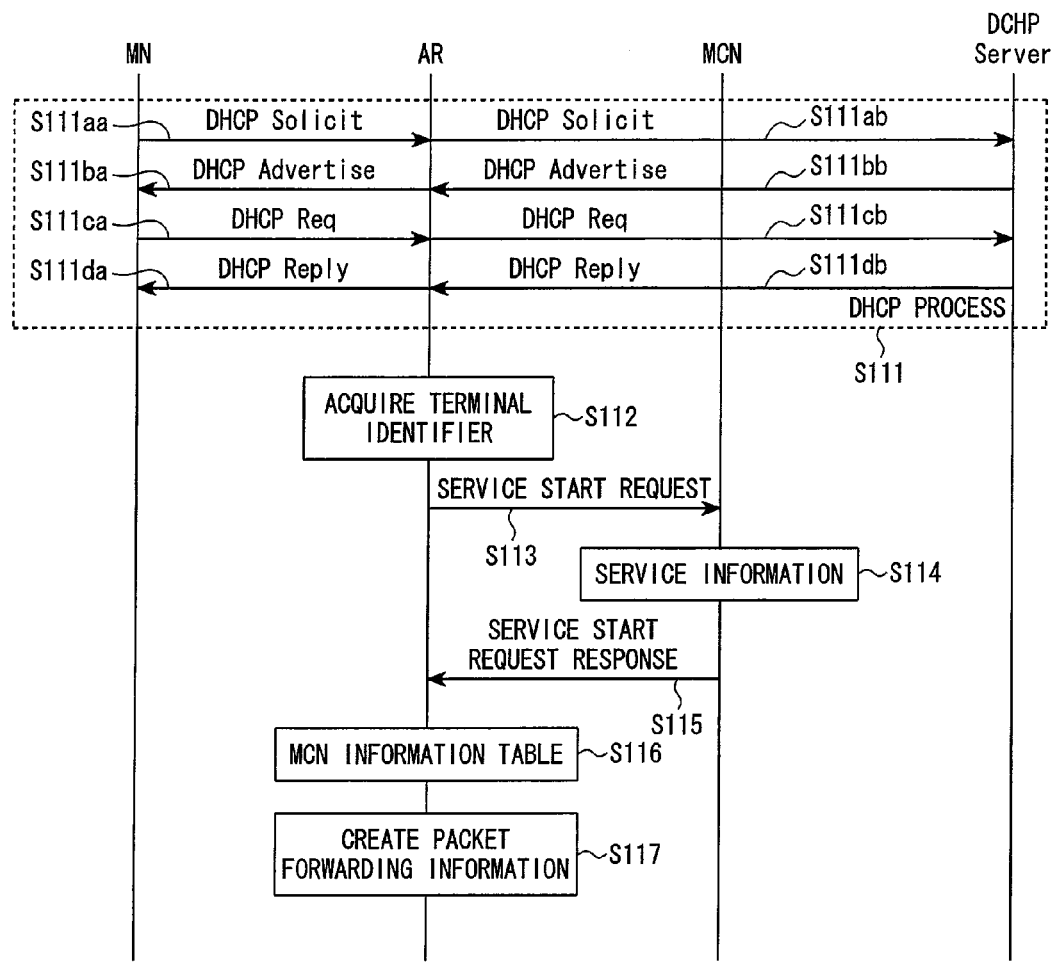
FIG. 14 is a diagram which shows a method for creating a terminal identifier at an initial connection using the DHCP process.

FIG. 14 is a sequence diagram which shows a process for creating a terminal identifier and the like at an initial connection to a network using DHCP. In the figure, transfer of signals among an MN, an AR, an MCN, and a DHCP server is shown.

In the figure, when the MN connects to the network, a DHCP process is performed (step S111). In other words, DHCP messages (DHCP Solicit/Advertisement/Request/Reply) defined in RFC3315 (Request For Comments 3315 by Internet Engineering Task Force) are sent and received to and from a DHCP server (steps S111aa, S111ab, S111ba, S111bb, S111ca, S111cb, S111da, S111db). At this time, the AR becomes a DHCP Relay Agent to relay and forward a message forwarded between the mobile terminal device and the DHCP server.

The AR acquires IP address information contained in DHCP Reply, breaks the information down into a Prefix and a Suffix, and determines this Suffix part as a terminal identifier (step S112).

Figure 15:
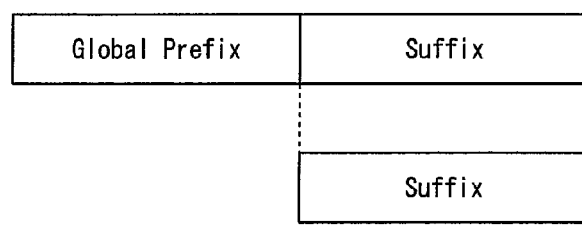
FIG. 15 is a diagram which shows a relation between an IP address of the mobile terminal device and a Suffix in the case of FIG. 14.

In FIG. 15, a relation between the IP address of the MN and the Suffix is shown. Referring to the figure, the IP address is composed of a Global Prefix part and a Suffix part, and the latter, that is, the Suffix part is used as a terminal identifier for identifying the MN. Incidentally, Suffix is a part corresponding to fixed information irrelevant to routing in an IP address assigned by DHCP, and is an information element which is not required to be changed when the DHCP reassigns the IP address even if a mobile terminal device moves.

Returning to FIG. 14, the AR sends a service start request message containing the IP address of the MN and the extracted terminal identifier to the MCN (step S113). When receiving this message, the MCN checks that there is no service information corresponding to the IP address of the MN on a held memory. Then, the MCN creates service information for providing a service to the MN (step S114). After that, the MCN sends a service start request response message to the AR (step S115). Upon receiving this service start request response message, the AR adds correspondence information between a T-ID and an MCN-ID to the MCN information table (step S116). Further, the AR creates packet forwarding information for forwarding a packet between the mobile terminal device and the MCN (step S117). Since then, the MCN starts providing a mobility service to the MN.

Figure 16:
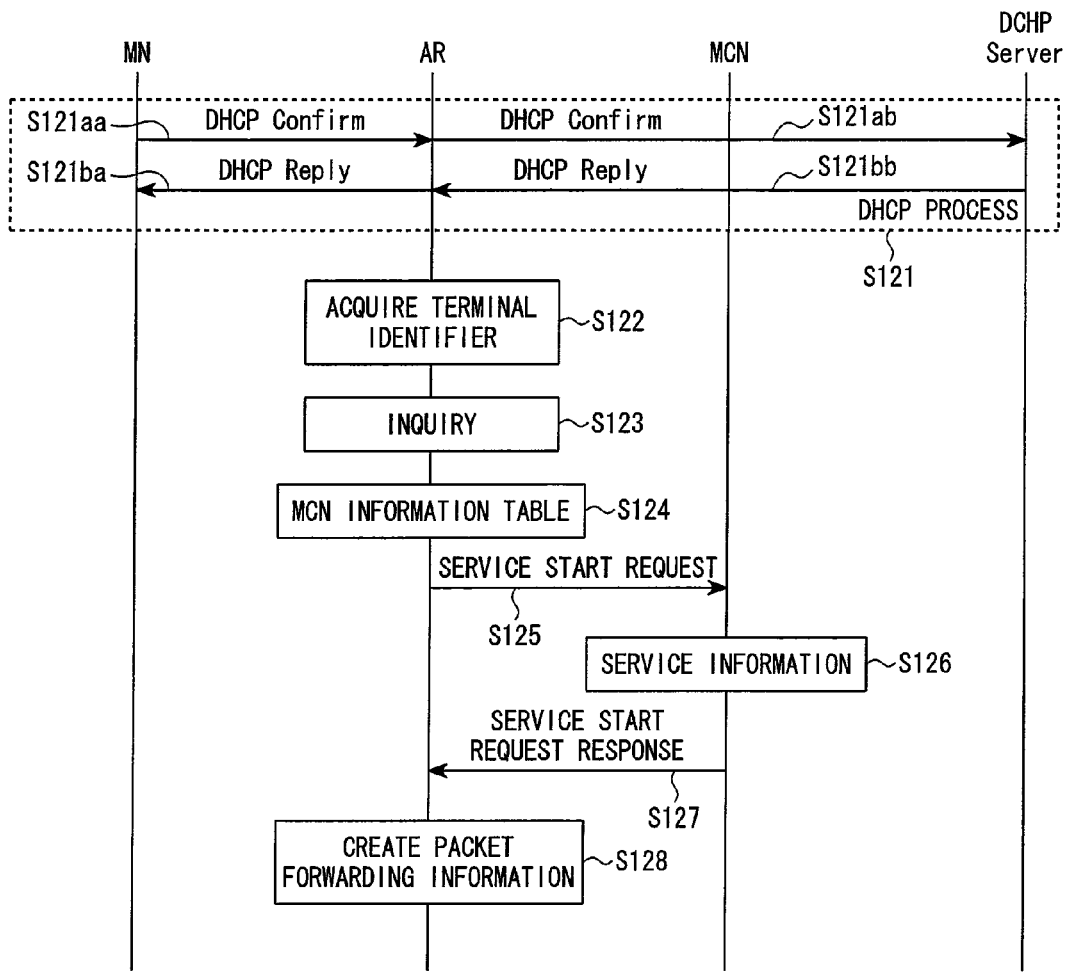
FIG. 16 is a diagram which shows a method for creating a terminal identifier in an IP address confirmation process using the DHCP process.

FIG. 16 is a sequence diagram which shows an IP address validity confirmation process due to change of a wireless or wired link and a method for creating a terminal identifier by an access router when an MN uses an IP address using DHCP. In the figure, transfer of signals among an MN, an AR, an MCN, and a DHCP server is shown.

In the figure, when the MN detects change of a connecting link, a DHCP process is performed (step S121). In other words, it sends/receives DHCP messages (DHCP Confirm/Reply) to/from the DHCP server (steps S121aa, S121ab, S121ba, S121bb). As in the case of FIG. 14, the AR operates as a Relay Agent, and extracts an IP address whose validity is confirmed and determines a Suffix part as a terminal identifier (step S122). Then, using this terminal identifier, the AR inquires of a surrounding AR about information of an MCN which provides a mobility service (step S123). The MCN information obtained as a result of the inquiry is held in the MCN information table in the AR (step S124).

Figure 17:
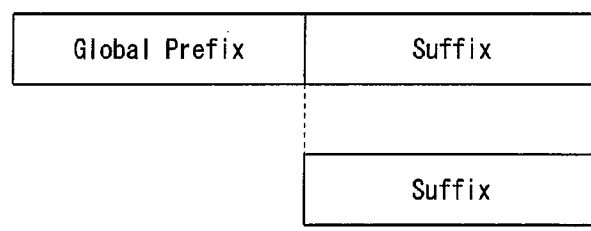
FIG. 17 is a diagram which shows a relation between an IP address of the mobile terminal device and a Suffix in the case of FIG. 16.
Figure 21:
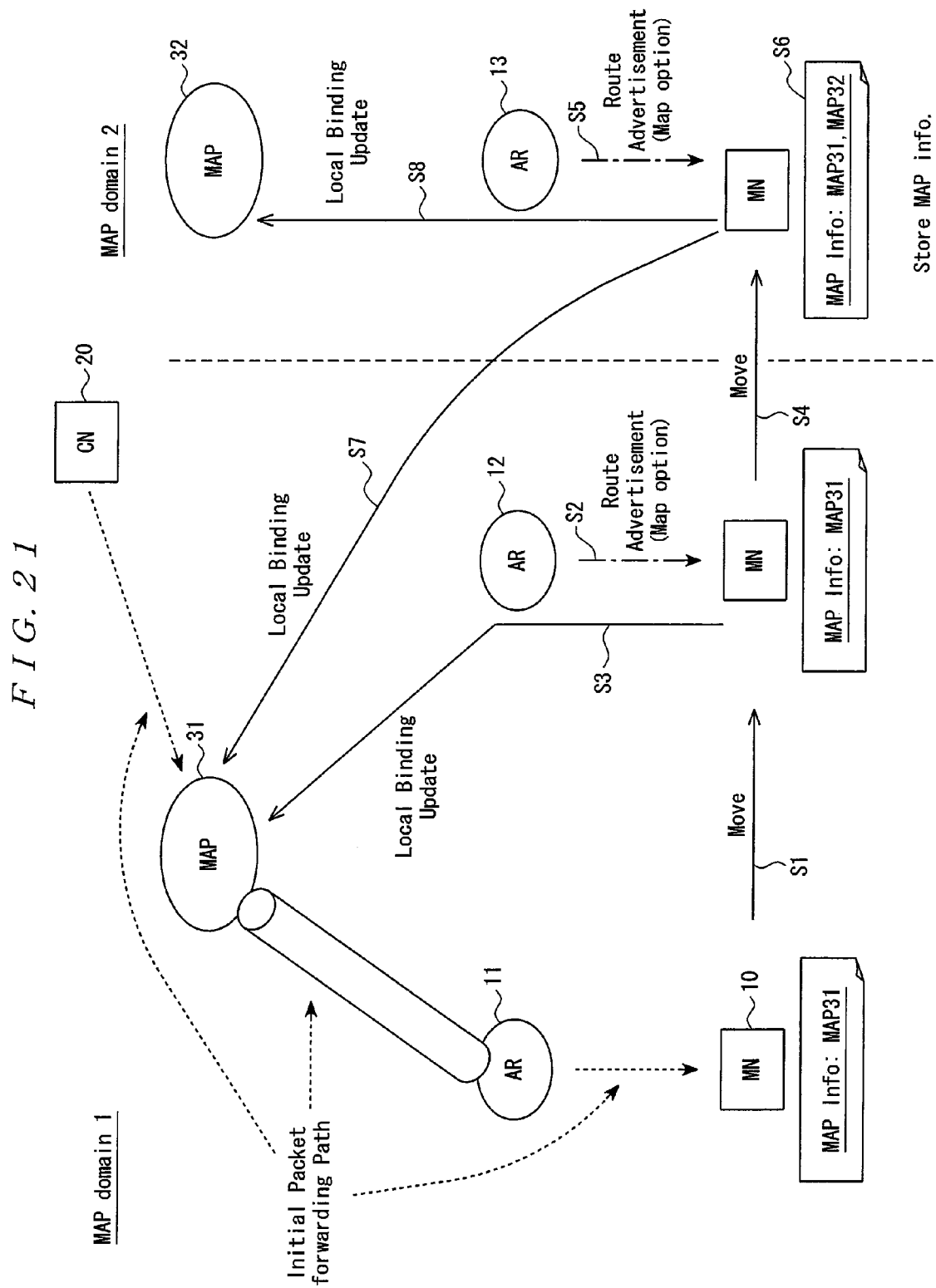
FIG. 21 is a problem of the HMIP which is a conventional technique.
Figure 22:
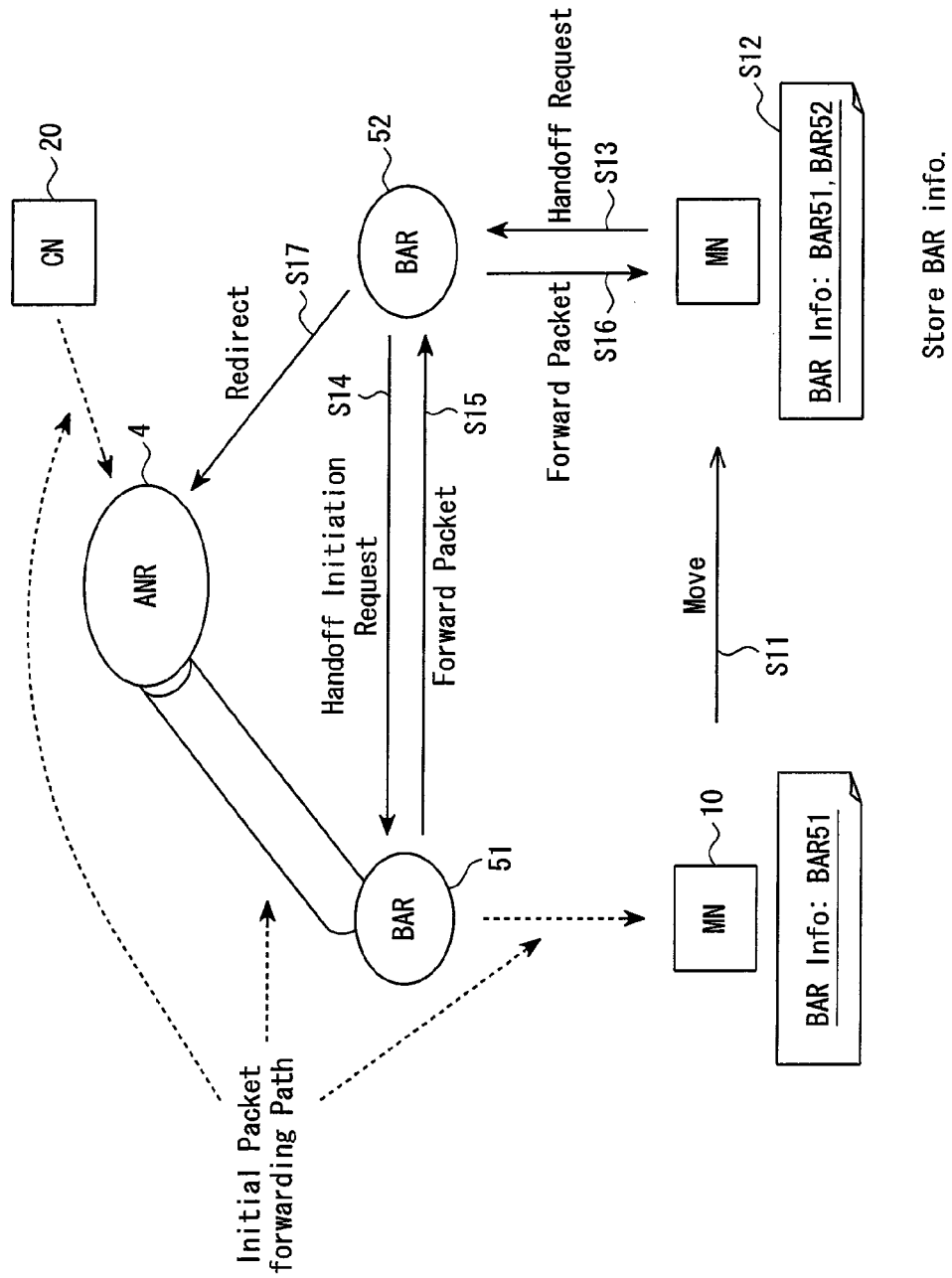
FIG. 22 is a problem of the BCMP which is a conventional technique.

In FIG. 17, a relation between an IP address of the MN and a Suffix is shown. Referring to the figure, the IP address is composed of a Global Prefix part and a Suffix part, and the latter, that is, the Suffix part is used as a terminal identifier for identifying the MN.

Returning to FIG. 16, the AR to which the MN currently connects sends a service start request containing the IP address of the MN and the extracted terminal identifier to the MCN (step S125). When receiving this message, the MCN checks that there is no service information corresponding to the IP address of the MN on a held memory. Then, the MCN creates packet forwarding information for forwarding a packet addressed to the IP address of the MN to the AR which is the message source (step S126). After that, the MCN sends a service start request response message to the AR (step S127). Upon receiving this service start request response message, the AR creates packet forwarding information for forwarding a packet between the mobile terminal device and the MCN (step S128). Thus, the MCN which provides the service before the MN moves provides the mobility service continuously to the MN.

(Mcn Information Table)

FIG. 18 is a diagram which shows a configuration example of an MCN information table. The MCN information table is composed of a terminal identifier (T-ID), MCN information (MCN-ID) such as an IP address of an MCN, validity period information which indicates a validity period of an entry, and other required option information. This MCN information table is held in an AR. An entry whose validity period is expired is automatically deleted according to validity period information of the entry. This validity period information may be updated in cooperation with packet forwarding information. Alternatively, an entry may be deleted by a message from an MCN instead of setting validity period information.

(Packet Forwarding Information)

FIG. 19 is a diagram which shoes a configuration example of packet forwarding information. The packet forwarding information shown in the diagram is composed of a terminal IP address which is a target of packet forwarding such as the above described terminal address, a forwarding IP address such as the above described connected MCN address, validity period information which indicates a validity period of an entry, and other required option information. This packet forwarding information is held in an AR. An entry whose validity period is expired is automatically deleted. If it is in cooperation with an MCN information table of an AR, a message for deleting the MCN information table of the AR may be sent from an MCN.

(Service Information)

FIG. 20 is a diagram which shows a configuration example of service information held in an MCN. The service information shown in the figure is composed of a terminal IP address which is a target of packet forwarding such as the above described terminal address, a forwarding IP address such as the above described connected MCN address, Prefix information which should be advertised to this terminal by an AR, validity period information which indicates a validity period of an entry, and other required option information. When DHCP process is used, Prefix information in the figure may not need to exist.

An entry whose validity period is expired is automatically deleted according to validity period information of the entry. Alternatively, an entry may be deleted by a message from an AR instead of setting validity period information.

(Service Control Method)

In the service control system described above, the following service control methods are provided. There is provided a service control method which controls a service between a service providing device which provides the service and a mobile terminal device which receives the service, comprising an inquiring step of inquiring of another device about information on the service providing device, a holding step of holding correspondence information between information obtained by an inquiry result of the inquiring step and identification information of the mobile terminal device, and a controlling step of controlling the service between the service providing device and the mobile terminal device based on the correspondence information held by the holding step. In this way, a network can transparently provide a service to the mobile terminal device without the mobile terminal device knowing an address of the service providing device in the network.

In addition, there is provided a service control method which controls transfer of a packet between a service providing device which provides a service and a mobile terminal device which receives the service, comprising an inquiring step of inquiring of another device about information on a device which relays the packet, a holding step of holding correspondence information between information obtained by an inquiry result of the inquiring step and identification information of the mobile terminal device, and a controlling step of controlling the transfer of the packet between the device which relays the packet and the mobile terminal device based on the correspondence information held by the holding step. In this way, a network can transparently provide a service to the mobile terminal device without the mobile terminal device knowing an address of the device which relays a packet in the network.

(Modification Example)

The above described service control system may be configured such that the AR also holds movement information of the MN, and the movement information and a movement history of the MN are forwarded as a part of information on the service providing device along with forwarding to a new AR. By this means, when the MN moves to the new AR, the AR can acquire information on the service providing device acquired from the old AR as well as the past movement information and movement history of the MN (ARs which the MN passed through). When the new AR acquires such information, and in a case where a kind of service to be provided has no problem even if a service providing device which provides such kind of service is changed while the service is being provided, the new AR can estimate a distance from a node which currently provides the service using the past movement information, and perform a process for switching a nearest service providing device of the new AR as needed.

(Conclusion)

By applying the present invention to such a network in which a control device in the network provides a mobile terminal device which moves, a service can be provided to the mobile terminal device without the mobile terminal device knowing information of the control device. In addition, a network provider can easily start providing service without the need to add a function for receiving the service provided by the network to the mobile terminal device. In addition, since a new message other than conventional messages that are sent and received between a mobile terminal device and a network is not required, an amount of signal exchanged between the mobile terminal device and the network can be reduced. In addition, by application to a mobility control scheme, a mobility service can be provided to a mobile terminal device which starts communication transparently for the mobile terminal device. Further, an access router to which a mobile terminal device moves is not required to previously know a mobility control node which provides a service to the mobile terminal device.

The present invention is not limited to the above described examples, and can be applied to a case where, in a network which accommodates a mobile terminal device which moves, an address of a control node in the network which provides a service at the network side can be uniquely determined without notifying the mobile terminal device of an address of a service providing device which provides a service to the mobile terminal device and without adding a function to the mobile terminal device side.

Industrial Applicability

The present invention can be used for controlling transfer of a packet between a service providing device which provides a service and a mobile terminal device which receives the service.

The invention claimed is:

1. An access router comprising:
an inquiry unit for inquiring of another access router about service providing device address information of a service providing device that can provide a service to a mobile terminal that is moving from a location area covered by a currently connected access router to another location area covered by another access router; and
a holding unit for holding correspondence information between the service providing device address information of the service providing device obtained by the inquiry unit and mobile terminal device address information of the mobile terminal device;
wherein the access router sends a service start request message including the mobile terminal device address information and a terminal identifier of the mobile terminal device uniquely identifiable in a communication network, to the service providing device so that the service providing device creates service information for providing the service to the mobile terminal device, and
wherein when the access router receives a service start request response message from the service providing device, the terminal identifier of the mobile terminal device and the service providing device address information are added in the holding unit as the correspondence information, so that the service between the service providing device and the mobile terminal device is controlled based on the correspondence information held in the holding unit.

2. The access router according to claim 1, further comprising an identification information acquiring unit for acquiring a part of an IP address in a message which is transferred between the access router and the mobile terminal device as the mobile terminal device address information of the mobile terminal device.

3. The access router according to claim 1, further comprising:
a Prefix information acquiring unit for acquiring Prefix information from a response to a message sent by the access router; and
an advertising unit for advertising the Prefix information acquired by the Prefix information acquiring unit to the mobile terminal device.

4. The access router according to claim 1, further comprising an identification information acquiring unit for acquiring a part of an IP address that is transferred between the mobile terminal device and a DHCP server as the mobile terminal device address information of the mobile terminal device.

5. The access router according to claim 1, wherein the service is provision of a mobility service to the mobile terminal device in a transparent manner.

6. The access router according to claim 1, wherein provision of the service from the service providing device to the mobile terminal device continues, without the service providing device address information being notified to the mobile terminal device, even after the mobile terminal device moved to the another location area covered by the another access router.

7. An access router which controls transfer of a packet between a service providing device which provides a service and a mobile terminal device which receives the service, the access router comprising:
   an inquiry unit for inquiring of another access router about mobility control device address information of a mobility control device which performs transfer of a packet between the mobility control device and a currently connected access router from a location area of which the mobile terminal device is moving to another location area covered by another access router; and
   a holding unit for holding correspondence information between the mobility control device address information of the mobility control device obtained by the inquiry unit and mobile terminal device address information of the mobile terminal device;
   wherein the access router sends a service start request message including the mobile terminal device address information and a terminal identifier of the mobile terminal device uniquely identifiable in a communication network, to the mobility control device so that the mobility control device creates service information for providing a service to the mobile terminal device, and
   wherein when the access router receives a service start request response message from the mobility control device, the terminal identifier of the mobile terminal device and the mobility control device address information are added in the holding unit as the correspondence information, the transfer of the packet between the mobility control device and the mobile terminal device is controlled based on the correspondence information held in the holding unit.

8. The access router according to claim 7, further comprising an identification information acquiring unit for acquiring a part of an IP address in a message which is transferred between the access router and the mobile terminal device as the mobile terminal device address information of the mobile terminal device.

9. The access router according to claim 7, further comprising:
   a Prefix information acquiring unit for acquiring Prefix information from a response to a message sent by the access router; and
   an advertising unit for advertising the Prefix information acquired by the Prefix information acquiring unit to the mobile terminal device.

10. The access router according to claim 7, further comprising an identification information acquiring unit for acquiring a part of an IP address that is transferred between the mobile terminal device and a DHCP server as the mobile terminal device address information of the mobile terminal device.

11. The access router according to claim 7, wherein provision of the service from the service providing device to the mobile terminal device continues, without the mobility control device address information being notified to the mobile terminal device, even after the mobile terminal device moved to the another location area covered by the another access router.

12. A service control system comprising:
   a service providing device which provides a service to a mobile terminal device; and
   an access router comprising an inquiry unit for inquiring of another access router about service providing device address information of the service providing device that can provide a service to the mobile terminal device that is moving from a location area covered by a currently connected access router to another location area covered by another access router, and a holding unit for holding correspondence information between the service providing device address information of the service providing device obtained by the inquiry unit and mobile terminal device address information of the mobile terminal device;
   wherein the access router sends a service start request message including the mobile terminal device address information and a terminal identifier of the mobile terminal device uniquely identifiable in a communication network, to the service providing device so that the service providing device creates service information for providing the service to the mobile terminal device, and
   wherein when the access router receives a service start request response message from the service providing device, the terminal identifier of the mobile terminal device and the service providing device address information are added in the holding unit as the correspondence information, so that the service between the service providing device and the mobile terminal device is controlled based on the correspondence information held in the holding unit.

13. A service control system comprising:
   a mobility control device which relays a packet between a service providing device which provides a service and a mobile terminal device which receives the service; and
   an access router comprising an inquiry unit for inquiring of another access router about mobility control device address information of the mobility control device which performs transfer of a packet between the mobility control device and a currently connected access router from a location area of which the mobile terminal device is moving to another location area covered by another access router, and a holding unit for holding correspondence information between the mobility control device address information of the mobility control device obtained by the inquiry unit and mobile terminal device address information of the mobile terminal device,
   wherein the access router sends a service start request message including the mobile terminal device address information and a terminal identifier of the mobile terminal device uniquely identifiable in a communication network to the mobility control device so that the service providing device creates service information for providing the service to the mobile terminal device, and
   wherein when the access router receives a service start request response message from the mobility control device, the terminal identifier of the mobile terminal device and the mobility control device address information are added in the holding unit as the correspondence information, the transfer of the packet between the mobility control device and the mobile terminal device is controlled based on the correspondence information held in the holding unit.

14. A service control method for controlling a service between a service providing device which provides the service and a mobile terminal device which receives the service, the method comprising:
   inquiring of another access router about service providing device address information of the service providing device that can provide a service to the mobile terminal device that is moving from a location area covered by a currently connected access router to another location area covered by another access router;

holding correspondence information between the service providing device address information of the service providing device obtained by the inquiring and mobile terminal device address information of the mobile terminal device;

sending a service start request message including the mobile terminal device address information and a terminal identifier of the mobile terminal device uniquely identifiable in a communication network, to the service providing device so that the service providing device creates service information for providing the service to the mobile terminal device;

receiving a service start request response message from the service providing device;

adding the terminal identifier of the mobile terminal device and the service providing device address information, as the correspondence information; and controlling the service between the service providing device and the mobile terminal device based on the correspondence information held.

15. A service control method for controlling transfer of a packet between a service providing device which provides a service and a mobile terminal device which receives the service, the method comprising:

inquiring of another access router about mobility control device address information of a mobility control device which performs transfer of a packet between the mobility control device and a currently connected access router from a location area of which the mobile terminal device is moving to another location area covered by another access router;

holding correspondence information between the mobility control device address information of the mobility control device obtained by the inquiring and mobile terminal device address information of the mobile terminal device;

sending a service start request message including the mobile terminal device address information and a terminal identifier of the mobile terminal device uniquely identifiable in a communication network, to the mobility control device so that the mobility control device creates service information for providing a service to the mobile terminal device;

receiving a service start request response message from the mobility control device;

adding the terminal identifier of the mobile terminal device and the mobility control device address information as the correspondence information; and controlling the transfer of the packet between the mobility control device which relays the packet and the mobile terminal device based on the correspondence information held.

* * * * *